US012640664B2

(12) United States Patent　　　(10) Patent No.: US 12,640,664 B2

Tsukagoshi et al.　　　(45) Date of Patent: May 26, 2026

(54) MOTOR CONTROL DEVICE, MOTOR CONTROL METHOD, HYBRID SYSTEM, BOOST CONVERTER SYSTEM, AND ELECTRIC POWER STEERING SYSTEM

(71) Applicant: HITACHI ASTEMO, LTD., Hitachinaka (JP)

(72) Inventors: Takaya Tsukagoshi, Hitachinaka (JP); Takafumi Hara, Tokyo (JP); Katsuhiro Hoshino, Hitachinaka (JP); Noriaki Hino, Hitachinaka (JP); Shigehisa Aoyagi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 223 days.

(21) Appl. No.: 18/703,130

(22) PCT Filed: Oct. 26, 2021

(86) PCT No.: PCT/JP2021/039556

§ 371 (c)(1),
(2) Date: Apr. 19, 2024

(87) PCT Pub. No.: WO2023/073816

PCT Pub. Date: May 4, 2023

(65) Prior Publication Data

US 2025/0226783 A1　　Jul. 10, 2025

(51) Int. Cl.
H02M 7/48 (2007.01)
B62D 5/04 (2006.01)
(Continued)

(52) U.S. Cl.
CPC ............ H02M 7/48 (2013.01); B62D 5/0472 (2013.01); H02P 23/28 (2016.02); H02P 25/026 (2013.01);
(Continued)

(58) Field of Classification Search
CPC .. H02M 7/5395; H02M 1/15; H02M 7/53871; H02M 7/48; H02P 27/085;
(Continued)

(56) References Cited

U.S. PATENT DOCUMENTS

| | | | | | |
|---|---|---|---|---|---|
| 2007/0278986 | A1* | 12/2007 | Okamura | ................. | H02P 5/74 |
| | | | | | 318/798 |
| 2008/0067960 | A1* | 3/2008 | Maeda | ................... | B62D 5/046 |
| | | | | | 180/443 |

(Continued)

FOREIGN PATENT DOCUMENTS

JP　　2021-083276 A　　5/2021

OTHER PUBLICATIONS

International Search Report with English Translation and Written Opinion in corresponding International Application No. PCT/JP2021/ 039556, dated Dec. 7, 2021.

*Primary Examiner* — Yusef A Ahmed
(74) *Attorney, Agent, or Firm* — Foley & Lardner LLP

(57) ABSTRACT

A motor control device that controls driving of an AC motor connected to a power converter performing power conversion from DC power to AC power, the AC motor driven using the AC power, includes a carrier wave generation unit that generates a carrier wave, a carrier wave frequency adjustment unit that adjusts frequency of the carrier wave, and a PWM control unit that performs pulse width modulation using the carrier wave on a voltage command corresponding to a torque command to generate a PWM pulse signal for controlling operation of the power converter, wherein the carrier wave frequency adjustment unit adjusts the frequency of the carrier wave so as to change a phase difference between the voltage command and the carrier wave based on magnitude of vibration for each circular (Continued)

order of electromagnetic excitation force generated circularly in a radial direction of the AC motor.

11 Claims, 11 Drawing Sheets

(51) Int. Cl.
    *H02P 23/28*          (2016.01)
    *H02P 25/026*         (2016.01)
    *H02P 25/03*          (2016.01)
    *H02P 27/08*          (2006.01)
    *H02P 29/50*          (2016.01)
(52) U.S. Cl.
    CPC ............ *H02P 25/03* (2016.02); *H02P 27/085*
                (2013.01); *H02P 29/50* (2016.02)
(58) Field of Classification Search
    CPC .......... H02P 27/08; H02P 23/14; H02P 21/00;
                H02P 23/28; H02P 25/026; H02P 25/03;
                H02P 29/50; B60L 53/20; B60L 2210/40;
                B60L 2240/526; B60L 2240/527; B60L
                2240/529; B60L 15/007; B60L 15/06;
                Y02T 10/72; B62D 5/0472
    See application file for complete search history.

(56)                    References Cited

U.S. PATENT DOCUMENTS

| | | | | |
|---|---|---|---|---|
| 2008/0106919 | A1* | 5/2008 | Shin | H02M 7/48 |
| | | | | 363/131 |
| 2010/0039056 | A1* | 2/2010 | Kobayashi | H02M 7/48 |
| | | | | 318/400.35 |
| 2010/0052583 | A1* | 3/2010 | Takamatsu | B60L 50/51 |
| | | | | 318/400.09 |
| 2011/0133678 | A1* | 6/2011 | Tomigashi | H02P 27/08 |
| | | | | 318/400.04 |
| 2011/0273125 | A1* | 11/2011 | Yamada | H02P 27/085 |
| | | | | 318/503 |
| 2011/0279071 | A1* | 11/2011 | Yamada | H02P 21/0089 |
| | | | | 318/400.02 |
| 2012/0249024 | A1* | 10/2012 | Saha | B60L 15/025 |
| | | | | 318/400.02 |
| 2013/0057193 | A1* | 3/2013 | Iwaji | H02P 6/188 |
| | | | | 318/721 |
| 2013/0063061 | A1* | 3/2013 | Hanada | H02P 29/62 |
| | | | | 318/400.14 |
| 2013/0234641 | A1* | 9/2013 | Li | H02P 27/08 |
| | | | | 363/34 |
| 2014/0077738 | A1* | 3/2014 | Iwaji | H02P 21/04 |
| | | | | 318/400.36 |
| 2016/0190972 | A1* | 6/2016 | Mori | H02P 21/22 |
| | | | | 318/490 |
| 2016/0308459 | A1* | 10/2016 | Fujii | H02M 1/12 |
| 2017/0093312 | A1* | 3/2017 | Hano | H02P 6/18 |
| 2017/0110999 | A1* | 4/2017 | Shimada | H02P 27/06 |
| 2017/0294863 | A1* | 10/2017 | Takahashi | H02P 21/20 |
| 2018/0097464 | A1* | 4/2018 | Yamakawa | H02P 9/04 |
| 2018/0105064 | A1* | 4/2018 | Matsubara | F02N 11/04 |
| 2018/0219506 | A1* | 8/2018 | Mori | B62D 5/046 |
| 2018/0337623 | A1* | 11/2018 | Ota | H02M 7/5395 |
| 2019/0222160 | A1* | 7/2019 | Yoshida | B60L 50/51 |
| 2019/0253014 | A1* | 8/2019 | Iwaji | H02P 21/02 |
| 2019/0280636 | A1* | 9/2019 | Ohta | H02P 6/10 |
| 2019/0334469 | A1* | 10/2019 | Hara | H02M 7/5395 |
| 2019/0363646 | A1* | 11/2019 | Ajima | H02P 27/08 |
| 2020/0119678 | A1* | 4/2020 | Hoshino | H02P 27/08 |
| 2020/0220488 | A1* | 7/2020 | Mori | H02M 7/5387 |
| 2020/0244203 | A1* | 7/2020 | Hara | H02P 3/04 |
| 2020/0389117 | A1* | 12/2020 | Takaoka | H02M 7/537 |
| 2021/0044243 | A1* | 2/2021 | Hara | H02P 27/085 |
| 2021/0384859 | A1* | 12/2021 | Hara | B60L 15/20 |
| 2022/0247328 | A1* | 8/2022 | Ajima | H02M 7/5395 |
| 2022/0294377 | A1* | 9/2022 | Takahashi | H02P 6/34 |
| 2022/0345060 | A1* | 10/2022 | Hara | H02P 27/12 |
| 2022/0376641 | A1* | 11/2022 | Mori | H02P 29/028 |
| 2023/0008549 | A1* | 1/2023 | Tsukagoshi | H02P 27/08 |
| 2023/0035063 | A1* | 2/2023 | Hara | H02M 7/5387 |
| 2023/0131967 | A1* | 4/2023 | Peddi | H02P 27/08 |
| | | | | 318/400.26 |
| 2023/0141601 | A1* | 5/2023 | Hara | B60L 15/007 |
| 2023/0223824 | A1* | 7/2023 | Hara | H02M 1/327 |
| | | | | 310/68 R |
| 2023/0402953 | A1* | 12/2023 | Tsukagoshi | H02P 27/08 |
| 2023/0412100 | A1* | 12/2023 | Kitagawa | B62D 5/04 |
| 2024/0042867 | A1* | 2/2024 | Hara | B60L 15/08 |
| 2024/0063746 | A1* | 2/2024 | Mori | H02P 25/22 |
| 2024/0154562 | A1* | 5/2024 | Hattori | H02K 16/00 |
| 2024/0227771 | A1* | 7/2024 | Tsukagoshi | H02P 29/50 |
| 2024/0262413 | A1* | 8/2024 | Hoshino | B62D 5/0472 |
| 2024/0291417 | A1* | 8/2024 | Aoyagi | H02P 27/08 |
| 2024/0380337 | A1* | 11/2024 | Hara | H02M 7/5395 |
| 2025/0226781 | A1* | 7/2025 | Sato | H02P 23/04 |

* cited by examiner

(a) MECHANICAL RESONANCE FREQUENCY AND CIRCULAR ORDER FREQUENCY (b) MAGNITUDE OF VIBRATION

FIG. 9

61 ELECTRIC POWER STEERING SYSTEM

62 STEERING WHEEL

75

1

102A,102B

66 TIRE

63 TORQUE SENSOR

64 STEERING ASSIST MECHANISM

8

65 STEERING MECHANISM

MOTOR CONTROL DEVICE, MOTOR CONTROL METHOD, HYBRID SYSTEM, BOOST CONVERTER SYSTEM, AND ELECTRIC POWER STEERING SYSTEM

TECHNICAL FIELD

The present invention relates to a motor control device, motor control method, hybrid system, boost converter system, and electric power steering system.

BACKGROUND OF THE INVENTION

Background Art

Permanent magnet synchronous motors do not require a mechanical current rectifying mechanism such as a brush or commutator, and they are easy to maintain, small in size, light in weight, and high in efficiency and power factor, so they are widely used in applications such as driving and generating electric vehicles. Generally, permanent magnet synchronous motors consist of a stator composed of an armature coil, etc., and a rotor composed of a permanent magnet, an iron core, etc. A DC voltage supplied from a DC power source such as a battery is converted to an AC voltage by an inverter, and an AC current is passed through the armature coil of the permanent magnet synchronous motor, thereby generating an armature magnetic flux. The permanent magnet synchronous motor is driven by magnet torque generated by attraction and repulsion forces generated between the armature magnetic flux and the magnet magnetic flux of the permanent magnet, and reluctance torque generated to minimize the magnetoresistance of the armature magnetic flux transmitted through the rotor.

In the permanent magnet synchronous motor, electromagnetic forces generated by the armature magnetic flux and the magnet magnetic flux are generated in the direction of rotation of the motor (circumferential direction) and the direction perpendicular to the rotation axis of the motor (radial direction), respectively. The torque described above is an integral of the electromagnetic force in the circumferential direction, which includes the fluctuation of the torque (torque pulsation) caused by the structure of the magnetic circuit of the motor. On the other hand, the electromagnetic force generated in the radial direction of the motor acts as an exciting force (electromagnetic exciting force) to deform and vibrate the stator and case of the motor.

During low rotation of the motor, vibration and noise caused by torque pulsation become apparent because other vibration and noise factors are few. In particular, in environment-friendly vehicles using permanent magnet synchronous motors such as electric vehicles and hybrid vehicles, vibration and noise may become noticeable due to the two-inertia system between the rotor of the motor and the tire during low rotation. On the other hand, in the rotation speed region of the motor excluding low rotation, the radial electromagnetic force (electromagnetic excitation force) is about 5~10 times larger than the circumferential electromagnetic force (torque pulsation). Therefore, vibration and noise caused by electromagnetic excitation force become dominant.

In addition, the AC current flowing through the motor includes a fundamental current component such as a sine wave, which is used for driving control of the motor and whose frequency is converted according to the rotational speed of the motor, and a harmonic current component due to switching operation of the inverter. The frequency of the harmonic current is determined by the frequency of the fundamental current and the frequency of the carrier wave used for PWM modulation. Therefore, depending on the rotational speed of the motor, the electromagnetic excitation force or torque pulsation generated in the motor by the fundamental current may overlap with the electromagnetic excitation force or torque pulsation generated in the motor by the harmonic current, resulting in large vibration and noise.

Regarding the reduction of vibration and noise caused by the electromagnetic excitation force or torque pulsation of the motor, the applicant has proposed a technique described in PTL 1. PTL 1 describes a method for effectively suppressing vibration and noise generated by a permanent magnet synchronous motor by adjusting the frequency of the carrier wave so as to change the phase difference between the voltage command and the carrier wave based on the torque command and the rotational speed of the AC motor.

CITATION LIST

Patent Literature

PTL 1: Japanese Laid-Open Patent Publication No. 2021-83276

SUMMARY OF INVENTION

Technical Problem

The electromagnetic excitation force of the motor is generated circularly in the radial direction. In this case, there exist multiple vibration modes such as the fourth order of the circular ring and the eighth order of the circular ring with the zero order of the circular ring as the reference mode, and depending on the motor state such as rotation speed and torque, the vibration of the motor due to the vibration mode other than the reference mode becomes relatively large and may not be ignored. However, since the method disclosed in PTL 1 does not consider multiple vibration modes in the electromagnetic excitation force, the vibration and noise caused by the electromagnetic excitation force of the motor cannot be effectively suppressed.

Solution to Problem

The motor control device according to the present invention that controls driving of an AC motor connected to a power converter performing power conversion from DC power to AC power, the AC motor driven using the AC power, includes a carrier wave generation unit that generates a carrier wave, a carrier wave frequency adjustment unit that adjusts frequency of the carrier wave, and a PWM control unit that performs pulse width modulation using the carrier wave on a voltage command corresponding to a torque command to generate a PWM pulse signal for controlling operation of the power converter, wherein the carrier wave frequency adjustment unit adjusts the frequency of the carrier wave so as to change a phase difference between the voltage command and the carrier wave based on magnitude of vibration for each circular order of electromagnetic excitation force generated circularly in a radial direction of the AC motor.

The motor control method according to the present invention for controlling driving of an AC motor connected to a power converter performing power conversion from DC power to AC power, the AC motor driven using the AC power, includes adjusting frequency of a carrier wave so as to change a phase difference between a voltage command corresponding to a torque command for the AC motor and the carrier wave based on magnitude of vibration for each circular order of electromagnetic exciting force generated circularly in a radial direction of the AC motor, generating the carrier wave at the adjusted frequency, and performing pulse width modulation using the carrier wave on the voltage command to generate a PWM pulse signal for controlling operation of the power converter.

The hybrid system according to the present invention includes the motor control device, a power converter operating on the basis of the PWM pulse signal output from the motor control device to perform power conversion from DC power to AC power, an AC motor driven using the AC power, and an engine system connected to the AC motor.

The boost converter system according to the present invention includes the motor control device, a boost converter connected to a DC power supply and that generates DC power by boosting the DC power supply in accordance with control of the motor control device, and a power converter that operates based on the PWM pulse signal output from the motor control device and performs power conversion from the DC power boosted by the boost converter to AC power.

The electric power steering system according to the present invention includes the motor control device, a plurality of power converters that operate on the basis of the PWM pulse signal output from the motor control device and perform power conversion from DC power to AC power, respectively, and an AC motor having a plurality of winding systems and that drives by flowing the AC power generated by the plurality of power converters to the plurality of winding systems, respectively, wherein the electric power steering system controls steering of a vehicle using the AC motor.

Advantageous Effects of Invention

According to the present invention, vibration and noise caused by electromagnetic excitation force of the motor can be effectively suppressed.

BRIEF DESCRIPTION OF DRAWINGS

FIG. 1 is an overall configuration diagram of a motor drive system including a motor control device according to an embodiment of the present invention.

FIG. 2 is a block diagram showing a functional configuration of a motor control device according to a first embodiment of the present invention.

FIG. 3 is a block diagram showing a carrier wave frequency adjustment unit according to the first embodiment of the present invention.

FIG. 9 is a configuration diagram of a boost converter system in the fourth embodiment of the present invention.

DESCRIPTION OF EMBODIMENTS

Figure 4:
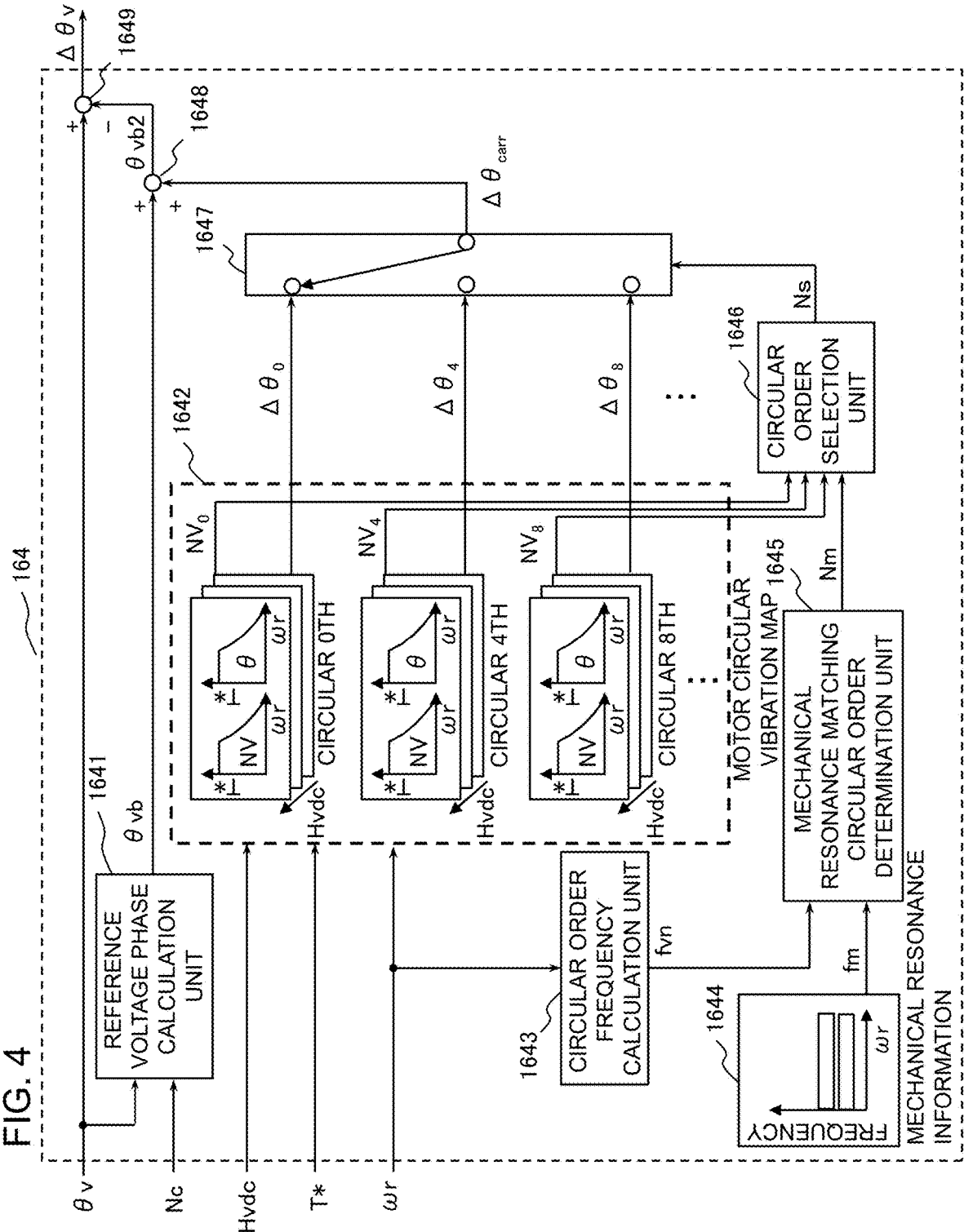
FIG. 4 is a block diagram showing a voltage phase error calculation unit according to the first embodiment of the present invention.

Hereinafter, embodiments for implementing the present invention will be described in detail with reference to the drawings. In the embodiments, examples of applications to motor drive systems mounted on electric vehicles or hybrid vehicles will be described.

First Embodiment

Figure 1:
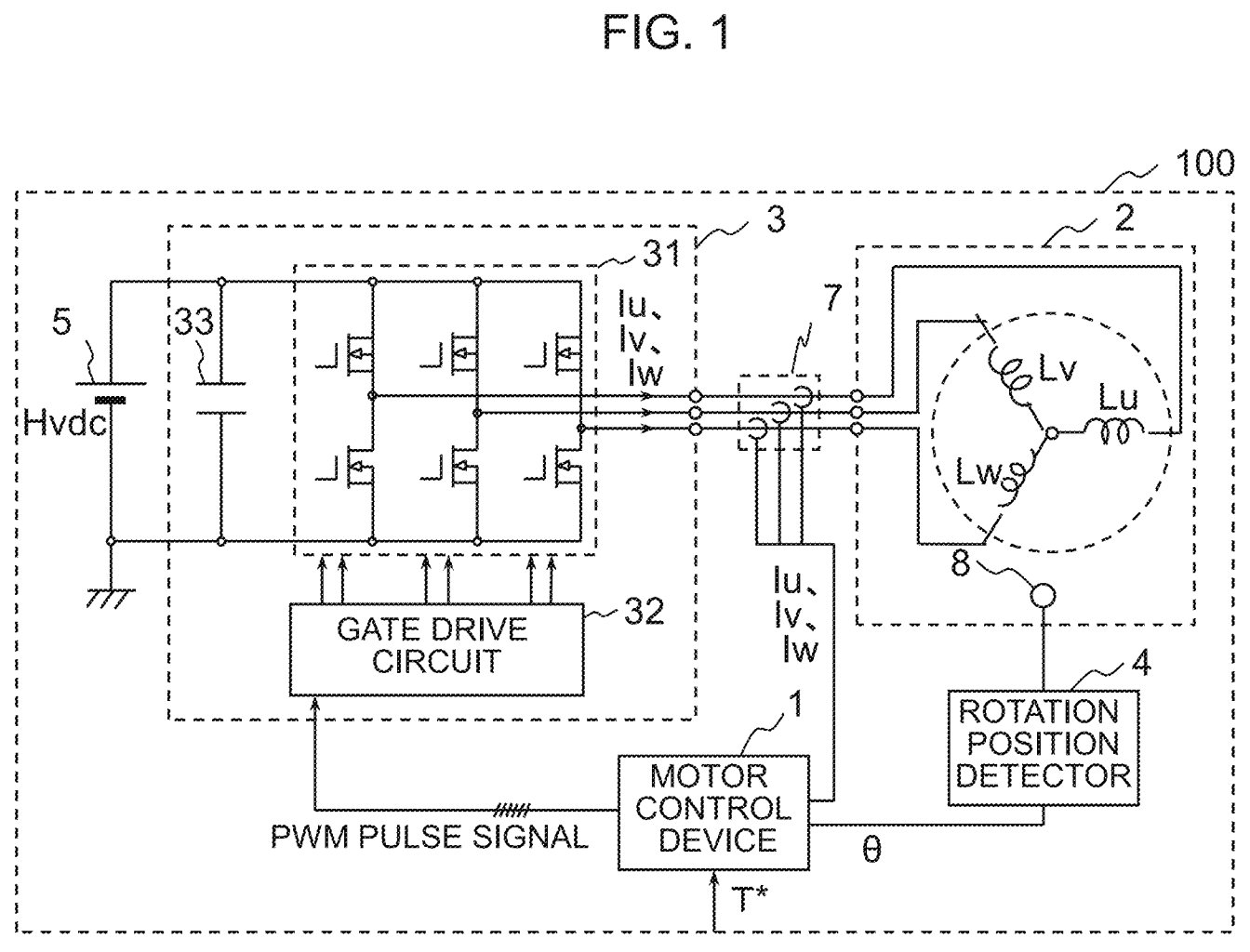

FIG. 1 is an overall configuration diagram of a motor drive system including a motor control device according to an embodiment of the present invention. In FIG. 1, the motor drive system 100 includes a motor control device 1, a permanent magnet synchronous motor (hereinafter simply referred to as "motor") 2, an inverter 3, a rotation position detector 4, and a high voltage battery 5.

The motor control device 1 controls the operation of the inverter 3 based on a torque command T* corresponding to a target torque required from the vehicle to the motor 2, thereby generating a PWM pulse signal for controlling the drive of the motor 2. The generated PWM pulse signal is output to the inverter 3. The details of the motor control device 1 will be described later.

The inverter 3 includes an inverter circuit 31, a gate drive circuit 32, and a smoothing capacitor 33. The gate drive circuit 32 generates a gate driving signal for controlling each switching element in the inverter circuit 31 based on the PWM pulse signal input from the motor control device 1, and outputs the generated signal to the inverter circuit 31. The inverter circuit 31 has switching elements corresponding to the upper and lower arms of the U phase, V phase, and W phase, respectively. By controlling these switching elements according to the gate drive signal input from the gate drive circuit 32, the DC power supplied from the high voltage battery 5 is converted into AC power and output to the motor 2. The smoothing capacitor 33 smooths the DC power supplied from the high voltage battery 5 to the inverter circuit 31.

The motor 2 is a synchronous motor rotationally driven by the AC power supplied from the inverter 3 and has a stator and a rotor. When the AC power input from the inverter 3 is applied to the armature coils Lu, Lv, and Lw provided in the stator, the three-phase AC currents Iu, Iv, and Iw are conducted in the motor 2, and armature magnetic flux is generated in each armature coil. When attraction and repulsion forces are generated between the armature magnetic flux of each armature coil and the magnet magnetic flux of the permanent magnet arranged in the rotor, torque is generated in the rotor, and the rotor is rotationally driven.

A rotation position sensor 8 for detecting the rotation position θ of the rotor is attached to the motor 2. The rotation position detector 4 calculates the rotation position θ from the input signal of the rotation position sensor 8. The calculation result of the rotation position θ by the rotation position detector 4 is input to the motor control device 1, and is utilized in the phase control of AC power performed by the motor control device 1 generating a PWM pulse signal in accordance with the phase of the induced voltage of the motor 2.

Although a resolver composed of an iron core and a winding is more suitable for the rotation position sensor 8, a magnetoresistive element such as a GMR sensor or a sensor using a Hall element may also be used. In addition, the rotation position detector 4 may estimate the rotation position θ by using the three-phase AC currents Iu, Iv and Iw flowing in the motor 2 or the three-phase AC voltages Vu, Vv and Vw applied from the inverter 3 to the motor 2 without using the input signal from the rotation position sensor 8.

Figure 2:
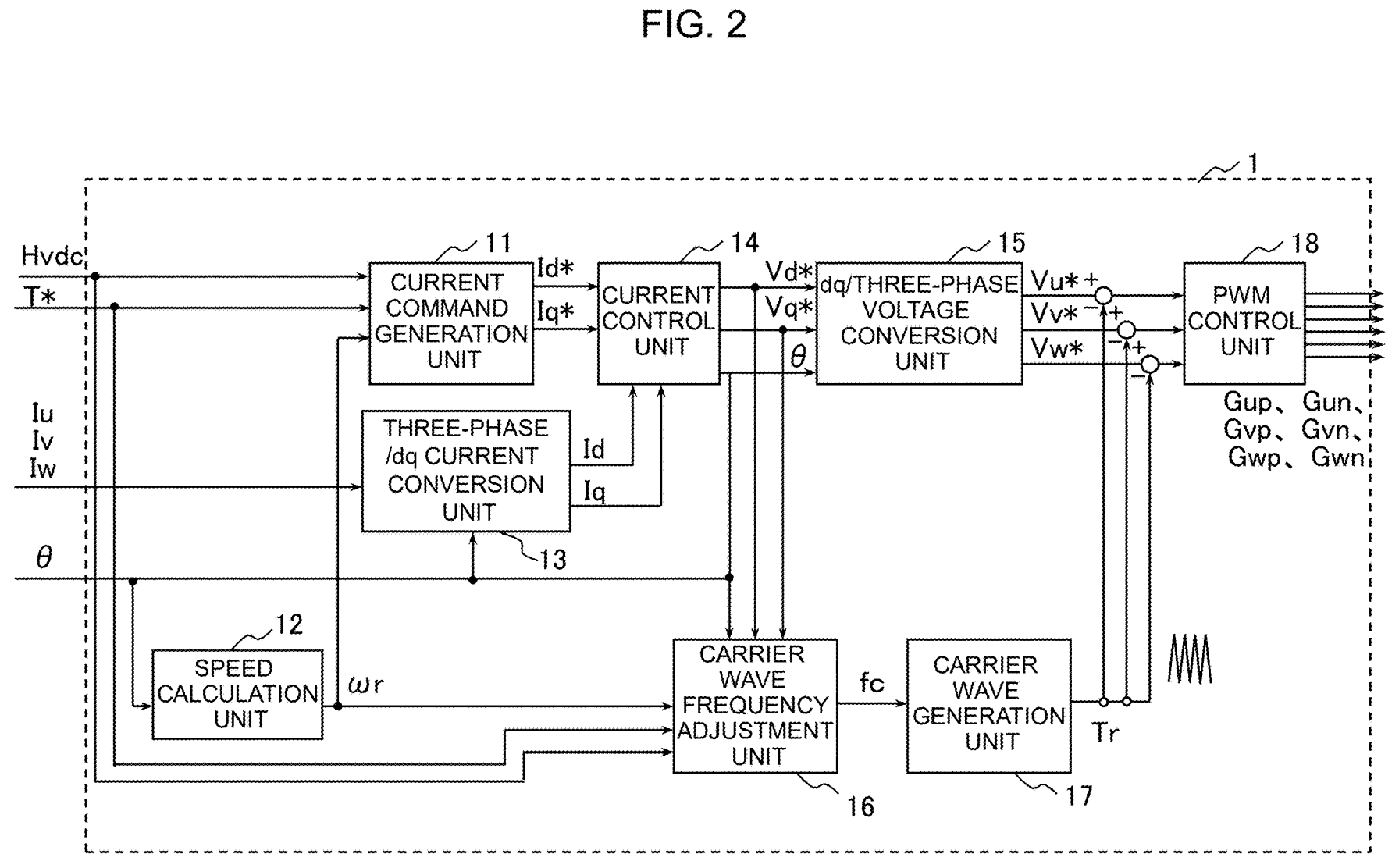

A current detection unit 7 is arranged between the inverter 3 and the motor 2. The current detection unit 7 detects three-phase AC currents Iu, Iv, and Iw (U phase AC current Iu, V phase AC current Iv and W phase AC current Iv) for energizing the motor 2. The current detection unit 7 is configured by using, for example, a Hall current sensor. The detection results of the three-phase AC currents Iu, Iv, and Iw by the current detection unit 7 are input to the motor control device 1 and used for generating the PWM pulse signal performed by the motor control device 1. Although FIG. 2 shows an example in which the current detection unit 7 is composed of three current detectors, it is possible to be provided with two current detectors and the AC current of the remaining one phase may be calculated from the fact that the sum of the three-phase AC currents Iu, Iv, and Iw is zero. In addition, the pulsed DC current flowing into the inverter 3 from the high voltage battery 5 may be detected by a shunt resistor or the like inserted between the smoothing capacitor 33 and the inverter 3, and the three-phase AC currents Iu, Iv, and Iw may be obtained based on the DC current and the three-phase AC voltages Vu, Vv, and Vw applied from the inverter 3 to the motor 2.

Next, details of the motor control device 1 will be described. FIG. 2 is a block diagram showing a functional configuration of the motor control device 1 according to the first embodiment of the present invention. In FIG. 2, the motor control device 1 includes a current command generation unit 11, a speed calculation unit 12, a three-phase/dq current conversion unit 13, a current control unit 14, a dq/three-phase voltage conversion unit 15, a carrier wave frequency adjustment unit 16, a carrier wave generation unit 17, and a PWM control unit 18. The motor control device 1 is constituted by, for example, a microcomputer, and can realize these functional blocks by executing a predetermined program in the microcomputer. Alternatively, some or all of these functional blocks may be realized using a hardware circuit such as a logic IC or an FPGA.

The current command generation unit 11 calculates the d-axis current command Id* and the q-axis current command Iq* based on the input torque command T* and the power supply voltage Hvdc. Here, for example, the d-axis current command Id* and the q-axis current command Iq* corresponding to the torque command T* are obtained by using a preset current command map, a mathematical expression, or the like.

The speed calculation unit 12 calculates the motor rotation speed ωr representing the rotation speed (the number of revolutions) of the motor 2 from the time change of the rotation position θ. Note that the motor rotation speed ωr may be either an angular speed (rad/s) or the number of revolutions (rpm). These values may be used by converting them into each other.

The three-phase/dq current conversion unit 13 performs dq conversion based on the rotation position θ determined by the rotation position detector 4 to the three-phase AC currents Iu, Iv, Iw detected by the current detection unit 7, and calculates the d-axis current value Id and the q-axis current value Iq.

Based on the deviation between the d-axis current command Id* and the q-axis current command Iq* output from the current command generation unit 11 and the d-axis current value Id and the q-axis current value Iq output from the three-phase/dq current conversion unit 13, the current control unit 14 calculates the d-axis voltage command Vd* and the q-axis voltage command Vq* in accordance with the torque command T* so that these values coincide respectively. Here, the d-axis voltage command Vd* in accordance with the deviation between the d-axis current command Id* and the d-axis current value Id, and the q-axis voltage command Vq* in accordance with the deviation between the q-axis current command Iq* and the q-axis current value Iq, are obtained by a control method such as PI control.

The dq/three-phase voltage conversion unit 15 performs three-phase conversion based on the rotation position θ determined by the rotation position detector 4 to the d-axis voltage command Vd* and the q-axis voltage command Vq* calculated by the current control unit 14, and calculates the three-phase voltage commands Vu*, Vv*, and Vw* (U phase voltage command value Vu*, V phase voltage command value Vv* and W phase voltage command value Vw*). As a result, the three-phase voltage commands Vu*, Vv*, and Vw* corresponding to the torque command T* are generated.

Based on the d-axis voltage command Vd* and the q-axis voltage command Vq* obtained by the current control unit 14, the rotation position θ obtained by the rotation position detector 4, the rotation speed or obtained by the speed calculation unit 12, the torque command T*, and the power supply voltage Hvdc, the carrier wave frequency fc representing the frequency of the carrier wave used to generate the PWM pulse signal is calculated by the carrier wave frequency adjustment unit 16. When the carrier wave generation unit 17 generates a carrier wave according to the carrier wave frequency fc, the frequency of the carrier wave is adjusted so that vibration and noise generated by the motor 2 can be suppressed. The details of the calculation method of the carrier wave frequency fc by the carrier wave frequency adjustment unit 16 will be described later.

The carrier wave generation unit 17 generates a carrier wave signal (triangular wave signal) Tr based on the carrier wave frequency fc calculated by the carrier wave frequency adjustment unit 16.

The PWM control unit 18 uses the carrier wave signal Tr output from the carrier wave generation unit 17 to perform pulse width modulation on the three-phase voltage commands Vu*, Vv*, and Vw* output from the dq/three-phase voltage conversion unit 15, respectively, to generate the PWM pulse signal for controlling the operation of the inverter 3. Specifically, based on the comparison result between the three-phase voltage commands Vu*, Vv*, and Vw* output from the dq/three-phase voltage conversion unit 15 and the carrier wave signal Tr output from the carrier wave generation unit 17, a pulse-like voltage is generated for each phase of the U phase, V phase, and W phase. Based on the generated pulse-like voltage, the PWM pulse signals for the switching elements of each phase of the inverter 3 are generated. At this time, the PWM pulse signals Gup, Gvp, and Gwp of the upper arm of each phase are logically inverted, and the PWM pulse signals Gun, Gvn, and Gwn of the lower arm are generated. The PWM pulse signal generated by the PWM control unit 18 is output from the motor control device 1 to the gate drive circuit 32 of the inverter 3, and is converted into a gate drive signal by the gate drive circuit 32. As a result, each switching element of the inverter circuit 31 is controlled on/off, and the output voltage of the inverter 3 is adjusted.

Next, the operation of the carrier wave frequency adjustment unit 16 in the motor control device 1 will be described. As described above, the carrier wave frequency adjustment unit 16 calculates the carrier wave frequency fc based on the d-axis voltage command Vd* and the q-axis voltage command Vq*, the rotation position θ, the rotation speed ωr, the torque command T*, and the power supply voltage Hvdc. By sequentially controlling the frequency of the carrier wave signal Tr generated by the carrier wave generation unit 17 in accordance with the carrier wave frequency fc, the period and phase of the carrier wave signal Tr are adjusted so as to have a desired relationship with the voltage waveforms of the three-phase voltage commands Vu*, Vv*, and Vw* in accordance with the torque command T*. The desired relationship here refers, for example, to a relationship such that any vibration mode of the electromagnetic excitation force generated in the radial direction of the motor 2 is suppressed.

Figure 3:
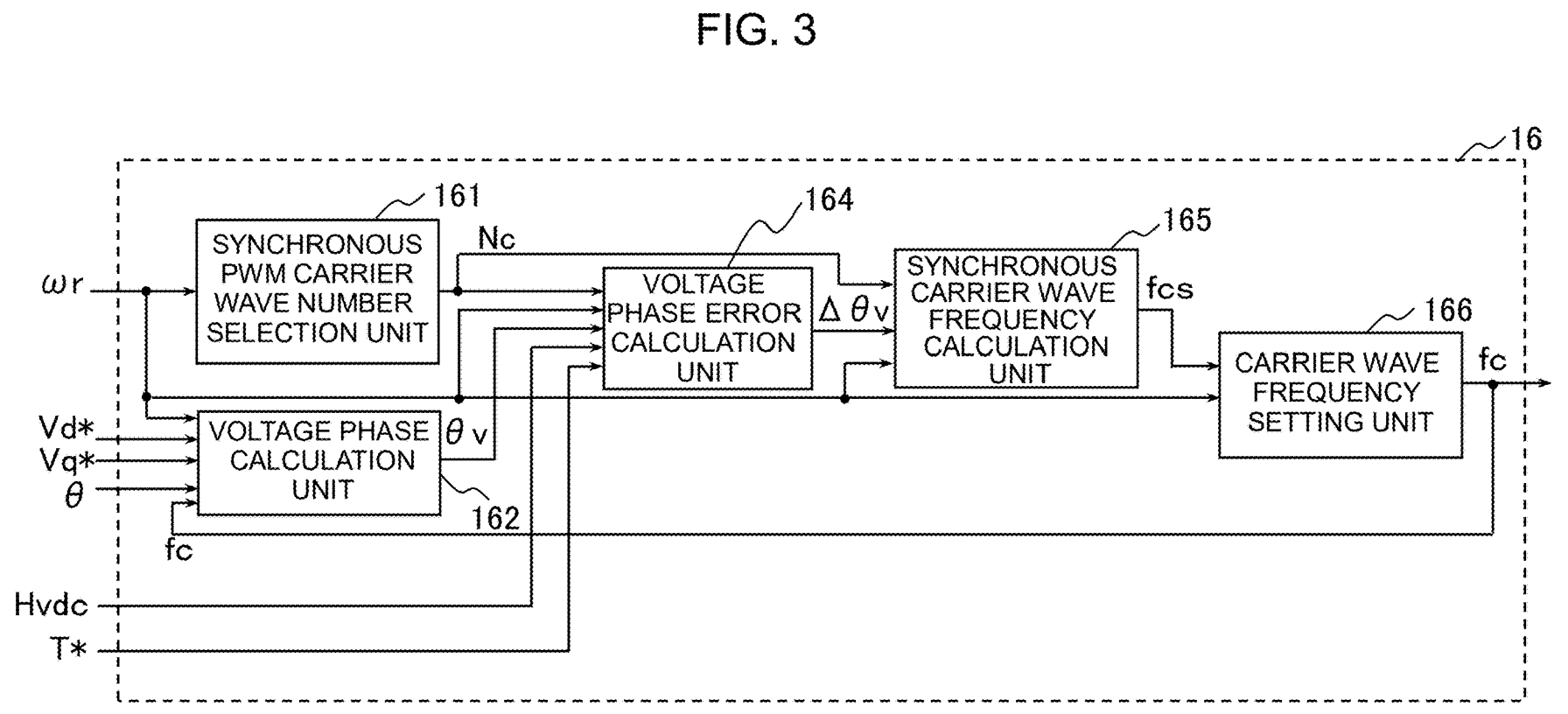

FIG. 3 is a block diagram of the carrier wave frequency adjustment unit 16 according to the first embodiment of the present invention. The carrier wave frequency adjustment unit 16 includes a synchronous PWM carrier wave number selection unit 161, a voltage phase calculation unit 162, a voltage phase error calculation unit 164, a synchronous carrier wave frequency calculation unit 165, and a carrier wave frequency setting unit 166.

The synchronous PWM carrier wave number selection unit 161 selects the synchronous PWM carrier wave number Nc representing the number of carrier waves for one period of the voltage waveform in the synchronous PWM control based on the rotation speed ωr. The synchronous PWM carrier wave number selection unit 161 selects, for example, a number satisfying the conditional expression of Nc=3× (2×n−1) in the multiples of 3 as the synchronous PWM carrier wave number Nc. In this conditional expression, n represents any natural number, and for example, n=1 (Nc=3), n=2 (Nc=9), n=3 (Nc=15), and the like are often selected. By using a special carrier wave, it is also possible to select a number that does not satisfy the above conditional expression even if it is a multiple of 3, such as Nc=6 or Nc=12, as the synchronous PWM carrier wave number Nc. The synchronous PWM carrier wave number selection unit 161 may select the synchronous PWM carrier wave number Nc based not only on the rotation speed ωr but also on the torque command T*. The selection criterion of the synchronous PWM carrier wave number Nc may be changed when the rotation speed ωr rises and falls, for example, by setting hysteresis.

The voltage phase calculation unit 162 calculates the voltage phase θv based on the d-axis voltage command Vd* and the q-axis voltage command Vq*, the rotation position θ, the rotation speed ωr, and the carrier wave frequency fc according to the following equations (1) to (4).

$$\theta v = \theta + \varphi v + \varphi dqv + 0.5\pi \quad (1)$$

$$\varphi v = \omega r \cdot 1.5 Tc \quad (2)$$

$$Tc = 1/fc \quad (3)$$

$$\varphi dqv = a\tan\left(Vq/Vd\right) \quad (4)$$

Here, φv represents the operation delay compensation value of the voltage phase, Tc represents the carrier wave period, and φdqv represents the voltage phase from the d-axis. The operation delay compensation value φv compensates for the occurrence of an operation delay equal to 1.5 control periods between the time when the rotation position detector 4 acquires the rotation position θ and the time when the motor control device 1 outputs the PWM pulse signal to the inverter 3. In this embodiment, 0.5π is added in the fourth term of the right side of equation (1). Since the voltage phase calculated in the first to third terms of the right side of equation (1) is a cos wave, this is an operation to perform viewpoint transformation on it into a sin wave.

The voltage phase error calculation unit 164 calculates the voltage phase error Δθv based on the synchronous PWM carrier wave number Nc selected by the synchronous PWM carrier wave number selection unit 161, the voltage phase θv calculated by the voltage phase calculation unit 162, the rotation speed or, the power supply voltage Hvdc, and the torque command T*. The voltage phase error Δθv represents the phase difference between the three-phase voltage commands Vu*, Vv*, and Vw*, which are the voltage commands for the inverter 3, and the carrier wave signal Tr used for pulse width modulation. When the voltage phase error calculation unit 164 calculates the voltage phase error Δθv for each predetermined operation period, the carrier wave frequency adjustment unit 16 changes the phase difference between the voltage commands for the inverter 3 and the carrier wave signal used for pulse width modulation, thereby suppressing vibration and noise generated by the motor 2.

The synchronous carrier wave frequency calculation unit 165 calculates the synchronous carrier wave frequency fcs based on the voltage phase error Δθv calculated by the voltage phase error calculation unit 164, the rotation speed ωr, and the synchronous PWM carrier wave number Nc selected by the synchronous PWM carrier wave number selection unit 161 according to the following equation (5).

$$fcs = \omega r \cdot Nc \cdot (1 + \Delta\theta v \cdot K)/(2\pi) \quad (5)$$

The synchronous carrier wave frequency calculation unit 165 can calculate the synchronous carrier wave frequency fcs based on the equation (5) by, for example, PLL (Phase Locked Loop) control. In the equation (5), the gain K may be a constant value or may be variable depending on conditions.

Based on the rotation speed ωr, the carrier wave frequency setting unit 166 selects either of the synchronous carrier wave frequency fcs calculated by the synchronous carrier wave frequency calculation unit 165 or the asynchronous carrier wave frequency fcns and outputs it as the carrier wave frequency fc. The asynchronous carrier wave frequency fcns is a fixed value previously set in the carrier wave frequency setting unit 166. A plurality of asynchronous carrier wave frequencies fcns may be prepared in advance, and one of them may be selected according to the rotation speed ωr. For example, the carrier wave frequency setting unit 166 can select the asynchronous carrier wave frequency fcns so that the value of the asynchronous carrier wave frequency fcns increases as the value of the rotation speed ωr increases, and output it as the carrier wave frequency fc.

Next, details of the calculation method of the voltage phase error $\Delta\theta v$ in the voltage phase error calculation unit 164 in the carrier wave frequency adjustment unit 16 will be described.

FIG. 4 is a block diagram of the voltage phase error calculation unit 164 according to the first embodiment of the present invention. The voltage phase error calculation unit 164 includes a reference voltage phase calculation unit 1641, a motor circular vibration map 1642, an circular order frequency calculation unit 1643, mechanical resonance information 1644, a mechanical resonance matching circular order determination unit 1645, an circular order selection unit 1646, a switching unit 1647, an addition unit 1648, and a subtraction unit 1649.

The reference voltage phase calculation unit 1641 calculates a reference voltage phase $\theta vb$ for fixing the phase of the carrier wave in synchronous PWM control based on the synchronous PWM carrier wave number Nc and the voltage phase $\theta v$.

Figure 5:
FIG. 5 is a conceptual diagram of a reference voltage phase calculation unit according to the present invention.

FIG. 5 is a conceptual diagram of the reference voltage phase calculation performed by the reference voltage phase calculation unit 1641. As shown in FIG. 5, for example, the reference voltage phase calculation unit 1641 calculates the reference voltage phase $\theta vb$ that varies in a step-like manner with the number of stages corresponding to the number of synchronous PWM carrier waves Nc between 0 and $2\pi$. FIG. 5 shows an example when the number of synchronous PWM carrier waves Nc is 3 for clarity, but in practice, the number of synchronous PWM carrier waves Nc is preferably Nc=3, 9, or 15 as described above. Alternatively, Nc=6 or 12 may be used.

In this embodiment, in order to reduce the processing load, for example, as shown in FIG. 5, the carrier wave frequency adjustment unit 16 can adjust the frequency of the carrier wave only in the valley-split section, which is the section where the triangular carrier wave rises from the minimum value (valley) to the maximum value (mountain). In this case, the synchronous carrier wave frequency calculation unit 165 performs synchronous PWM control by sequentially calculating the synchronous carrier wave frequency fcs from the voltage phase error $\Delta\theta v$ in the valley-split section of the carrier wave. The reference voltage phase calculation unit 1641 calculates the reference voltage phase $\theta vb$ used for calculating the voltage phase error $\Delta\theta v$ as a discrete value that varies in $\pi/3$ intervals as shown in FIG. 5. The interval of the reference voltage phase $\theta vb$ varies according to the number of synchronous PWM carrier waves Nc. As the number of synchronous PWM carrier waves Nc increases, the interval of the reference voltage phase $\theta vb$ decreases.

Specifically, the reference voltage phase calculation unit 1641 calculates the reference voltage phase $\theta vb$ based on the voltage phase $\theta v$ and the synchronous PWM carrier wave number Nc according to the following equations (6) to (7).

$$\theta vb = \text{int}\left(\theta v/\theta s\right) \cdot \theta s + 0.5\theta s \qquad (6)$$

$$\theta s = 2\pi/Nc \qquad (7)$$

Here, $\theta s$ represents the change width of the voltage phase $\theta v$ per carrier wave, and int represents the truncation operation after the decimal point.

In this embodiment, the reference voltage phase $\theta vb$ is calculated in accordance with the equations (6) through (7) in the reference voltage phase calculation unit 1641 so that the reference voltage phase $\theta vb$ becomes 0 rad in the mountain-divided section, which is the section where the triangular carrier wave falls from the maximum value (mountain) to the minimum value (valley). However, the period in which the reference voltage phase $\theta vb$ becomes 0 rad is not limited to the mountain-divided section. If it is possible to calculate the reference voltage phase $\theta vb$, which varies in a step-like manner with the number of stages corresponding to the synchronous PWM carrier wave number Nc between 0 and 2n using the voltage phase $\theta v$, the reference voltage phase calculation unit 1641 may calculate the reference voltage phase $\theta vb$ by a calculation method other than the equations (6) to (7).

The motor circular vibration map 1642 is information on the vibration caused by the electromagnetic exciting force generated in a circular manner in the radial direction in the motor 2. Here, in the motor 2 which is a synchronous motor using permanent magnets, electromagnetic forces caused by the armature magnetic flux and the magnet magnetic flux are generated in the rotational direction (circumferential direction) of the motor 2 and in the direction perpendicular to the rotational axis of the motor 2 (radial direction), respectively. Among them, the electromagnetic force in the radial direction is generated in a circular manner around the rotational axis of the motor 2 and acts as an electromagnetic excitation force to deform and vibrate the stator and case of the motor 2. In the vibration caused by the electromagnetic excitation force, there exist vibration modes corresponding to a plurality of circular orders such as the circular fourth order and the circular eighth order, using the circular zeroth order as a reference mode, and the magnitude of the vibration in each vibration mode varies according to the parameter values of the rotation speed $\omega r$, the torque command T*, and the power supply voltage Hvdc. Therefore, in this embodiment, information indicating the relationship between the parameter values of the rotation speed $\omega r$, the torque command T*, and the power supply voltage Hvdc and the magnitude of the vibration caused by the electromagnetic excitation force radially generated in the motor 2 is stored in the voltage phase error calculation unit 164 as a motor circular vibration map 1642 for each circular order. By referring to the motor circular vibration map 1642, the voltage phase error calculation unit 164 can calculate the magnitude NVn of the vibration of the motor 2 corresponding to the current rotation speed $\omega r$, the torque command T*, and the power supply voltage Hvdc for each circular order. Here, in the magnitude NVn of the vibration, n represents the circular order, and an integer such as n=0, 4, 8, for example, is applicable.

Further, the motor circular vibration map 1642 includes, in addition to the above-mentioned information on the magnitude of the vibration for each circular order, information on the phase shift amount representing the phase difference between the voltage command and the carrier wave for reducing the vibration. The applicant has already proposed an art that, by adjusting the frequency of the carrier wave so that the phase difference between the voltage command and the carrier wave is a predetermined value, the vibration caused by the fundamental current of the motor and the vibration caused by the harmonic component of the motor are cancelled with each other, thereby reducing the vibration of the motor 2 (see PTL 1). In this embodiment, by applying this prior art, the relationship between the parameter values of the rotation speed $\omega r$, the torque command T*, and the power supply voltage Hvdc and the optimum phase shift amount for reducing the vibration caused by the electromagnetic excitation force generated in the radial direction of the motor 2 is obtained in advance for each vibration mode, and stored in the voltage phase error calculation unit 164 as a motor circular vibration map 1642 for each circular order. By referring to the motor circular vibration map 1642, the voltage phase error calculation unit 164 can calculate the phase shift amount Δθn corresponding to the current rotation speed ωr, the torque command T*, and the power supply voltage Hvdc for each circular order. In the phase shift amount Δθn, n represents the circular order as in the case of the vibration magnitude NVn, and an integer such as n=0, 4, 8, for example, is applicable.

The vibration magnitude NVn and the phase shift amount Δθn for each circular order calculated by the motor circular vibration map 1642 are respectively output to the circular order selection unit 1646 and the switching unit 1647. In FIG. 4, the motor circular vibration map 1642 is defined for the circular 0th, 4th, and 8th orders, and the vibration magnitudes NV0, NV4, and NV8 and the phase shift amounts Δθ0, Δθ4, and Δθ8 are calculated from these maps. However, the vibration magnitude NVn and the phase shift amount Δθn may also be calculated for other circular orders (For example, 12th, 16th, etc.).

The values of the vibration magnitude and the phase shift amount for each circular order in the motor circular vibration map 1642 may be predetermined at the time of development or design of the motor drive system 100 based on the results of magnetic field analysis and vibration measurement tests of the motor 2 conducted in advance. That is, the voltage phase error calculation unit 164 includes the motor circular vibration map 1642 in which the vibration magnitude NVn and the phase shift amount Δθn are defined for each of the rotation speed ωr, torque command T* and power supply voltage Hvdc of the motor 2 for each of the plurality of circular orders. The carrier wave frequency adjustment unit 16 can calculate the vibration magnitude NVn and the phase shift amount Δθn for each circular order based on the current rotation speed ωr, torque command T* and power supply voltage Hvdc and the motor circular vibration map 1642 in the voltage phase error calculation unit 164.

A circular order frequency calculation unit 1643 calculates the frequency of each circular ring order from the rotation speed ωr. Here, for the rotation speed ωr [rpm] of the motor 2 defined by the machine angle, the frequency fvn can be calculated for each circular ring order by the following equation (8), for example.

$$fvn = (\omega r/60) \cdot (Nr \cdot Pm \pm n) \qquad (8)$$

Here, n represents the circular order as in the case of the aforementioned vibration magnitude NVn and the phase shift amount Δθn. Nr represents the order of the electromagnetic excitation force relative to the fundamental wave current, which is a multiple of 6 (6, 12, 18, 24, . . . ). The circular order frequency calculation unit 1643 can set the value of Nr in accordance with the order of the electromagnetic excitation force to be suppressed. Furthermore, Pm represents the number of pole pairs of the motor 2.

According to the above equation (8), for example, when Nr=12 and Pm=4, the frequency of the vibration mode of the circular fourth order (n=4) can be obtained as fv4=ωr/60·44 (the electric angle of rotation 44th order) and ωr/60·52 (the electric angle of rotation 52nd order). For the other circular orders, the frequency can be similarly obtained from equation (8).

The mechanical resonance information 1644 represents the frequency of the mechanical resonance of the motor 2.

For example, the frequency band fm of the mechanical resonance corresponding to the natural frequency of the motor 2 can be set in advance with a predetermined bandwidth based on the design value of the motor 2 and the analysis value in the hammering test, and stored in the voltage phase error calculation unit 164 as the mechanical resonance information 1644. Note that the mechanical resonance information 1644 may be set including those other than the motor 2. For example, when the inverter 3 and reduction gears (not shown) are mechanically fixed to the motor 2, or when the motor 2 is mounted on a vehicle, it is preferable to set the frequency of the mechanical resonance including these as the mechanical resonance information 1644. When a plurality of mechanical resonance points of the motor 2 exist, it is preferable to set the mechanical resonance information 1644 for each resonance point.

Based on the frequency fvn of each circular order calculated by the circular order frequency calculation unit 1643 and the frequency of the mechanical resonance represented by the mechanical resonance information 1644, the circular order in which the frequency coincides with the mechanical resonance of the motor 2 is specified as the mechanical resonance matching circular order Nm by the mechanical resonance matching circular order determination unit 1645. Here, it is confirmed whether or not any of the frequencies fvn of the respective circular orders are included in the frequency band fm of the mechanical resonance represented by the mechanical resonance information 1644, and when the frequency fvn included in the frequency band fm of the mechanical resonance exists, the circular order n corresponding to the frequency fvn is specified as the mechanical resonance matching circular order Nm. The mechanical resonance matching circular order Nm specified by the mechanical resonance matching circular order determination unit 1645 is output to the circular order selection unit 1646.

If none of the frequencies fvn of each circular order is included within the frequency band fm of the mechanical resonance, the mechanical resonance matching circular order determination unit 1645 may notify the circular order selection unit 1646 that the mechanical resonance matching circular order Nm does not exist. If two or more of the frequencies fvn of each circular order are included within the frequency band fm of the mechanical resonance, the mechanical resonance matching circular order determination unit 1645 may notify the circular order selection unit 1646 of the respective circular order n as the mechanical resonance matching circular order Nm. Alternatively, one of the frequencies fvn may be selected according to the magnitude of the resonance vibration expected in each of them, and the circular order selection unit 1646 may be notified it as the mechanical resonance matching circular order Nm.

Figure 6:
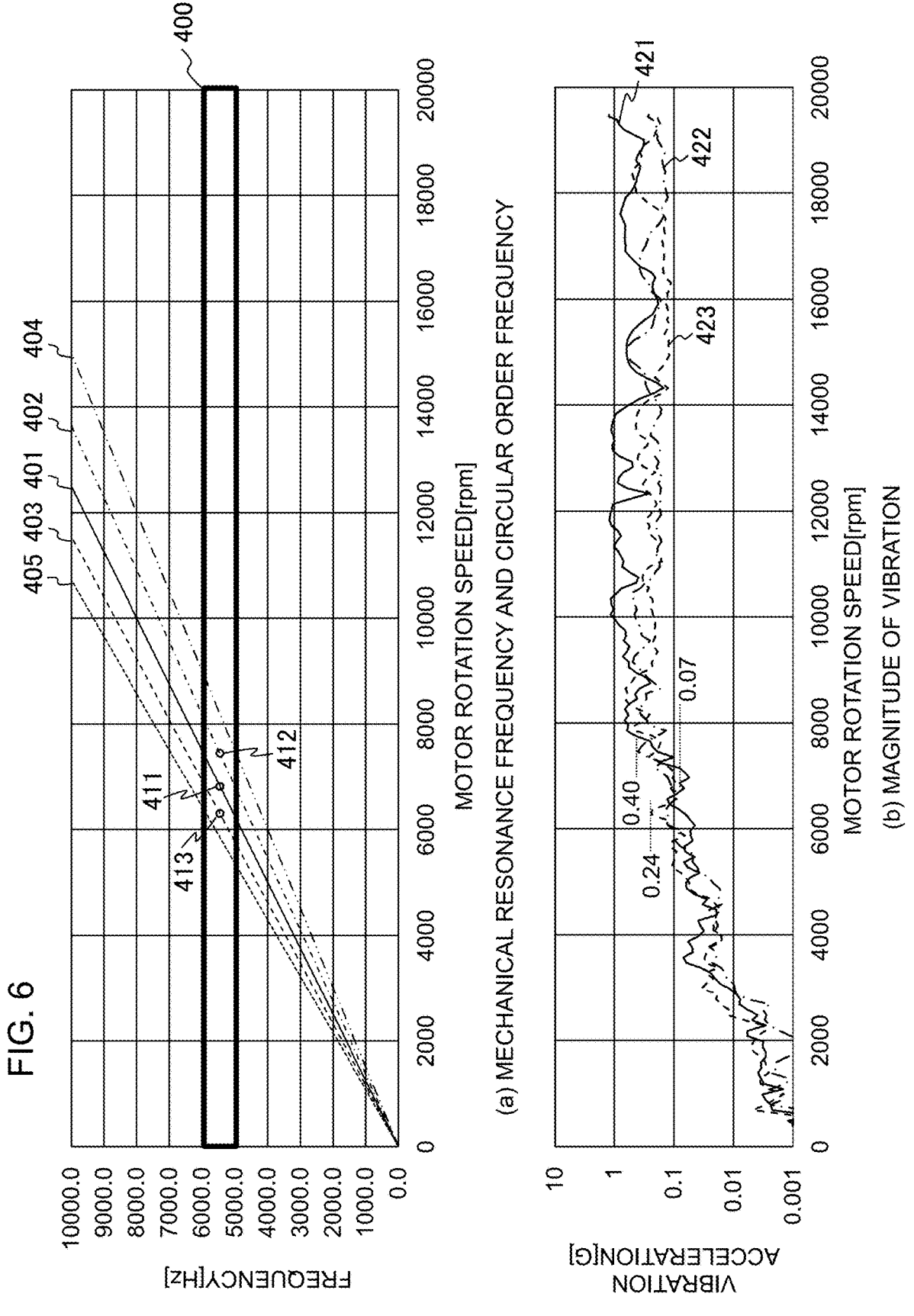
FIG. 6 is a diagram showing an example of frequency and magnitude of motor vibration for each circular order.

FIG. 6 is a diagram showing an example of the frequency and the magnitude of the motor vibration for each circular order. FIG. 6(a) is an example of a graph showing the relationship between the mechanical resonance of the motor 2 and the frequency fvn for each circular order. The horizontal axis represents the number of revolutions (rotation speed) ωr of the motor 2, and the vertical axis represents the frequency. FIG. 6(b) is an example of a graph showing the relationship between the motor rotation speed ωr and the magnitude of vibration for each circular order. The horizontal axis represents the number of revolutions (rotation speed) ωr of the motor 2, and the vertical axis represents the vibration acceleration [G].

In FIG. 6(a), the straight line graph 401 shows the relationship between the motor rotation speed ωr and the frequency fvn of the circular 0th order (rotation 48th order).

The straight line graphs 402 and 403 show the relationship between the motor rotation speed ωr and the frequency fvn of the circular 4th order (rotation 44th order and 52nd order), and the straight line graphs 404 and 405 show the relationship between the motor rotation speed ωr and the frequency fvn of the circular 8th order (rotation 40th order and 56th order).

Here, for example, as shown in FIG. 6(a), it is assumed that the frequency band 400 of 5000~6000 [Hz] is set as the frequency band fm of the mechanical resonance in the mechanical resonance information 1644. In this case, in the range where the motor rotation speed or is about 5000~9000 [rpm], at least one of the linear graphs 401~405 exists in the frequency band 400, and it is considered that the vibration of the motor 2 increases due to the mechanical resonance in the vibration mode of the circular order represented by the graph. In particular, in the vibration modes such as the circular 4th order and the circular 8th order, the stator and the case of the motor 2 are more likely to be deformed compared with the circular 0th order which is the reference mode, and are therefore more likely to be affected by the mechanical resonance.

In FIG. 6(b), graph 421 shows the relationship between the motor rotation speed or of the circular 0th order (rotation 48th order) and the magnitude of motor vibration. Graphs 422 and 423 show the relationship between the motor rotation speed ωr of the circular 4th order (rotation 44th order and 52nd order) and the magnitude of motor vibration.

In FIG. 6(a), when the motor rotation speed ωr corresponding to each center point 411, 412, 413 of the straight line graphs 401~403 in the frequency band 400 is respectively specified, the magnitude of motor vibration for each circular order at the motor rotation speed ωr is obtained from the graphs 421~423 of FIG. 6(b). Specifically, the magnitude of motor vibration of the circular 0th order (rotation 48th order) is obtained from the graph 421 to 0.07 [G], the magnitude of motor vibration of the circular 4th order (rotation 44th order) is obtained from the graph 422 to 0.40 [G], and the magnitude of motor vibration of the circular 4th order (rotation 52nd order) is obtained from the graph 423 to 0.24 [G]. From these magnitudes of motor vibration, it can be confirmed that the circular 4th order is more affected by mechanical resonance than the circular 0th order.

The circular order selection unit 1646 selects one of the circular orders based on the magnitude of vibration NVn for each circular order calculated by the motor circular vibration map 1642 and the mechanical resonance matching circular order Nm specified by the mechanical resonance matching circular order determination unit 1645. Here, the vibration magnitudes NVn for each circular order are compared with each other, and the circular order is selected based on these comparison results and the mechanical resonance matching circular order Nm. Specifically, when the vibration magnitudes NVn of each circular order are similar (for example, the differences between each of them are within 0.05 [G]), the mechanical resonance matching circular order Nm is preferentially selected. On the other hand, when the vibration magnitude NVn of the circular order (e.g., circular 0th order), which is a vibration mode hardly affected by mechanical resonance, is significantly larger than the vibration magnitude NVn of the mechanical resonance matching circular order Mn (e.g., circular 4th order) (for example, the difference is 0.05 [G] or more), the mechanical resonance matching circular order Mn is not selected and the circular order is selected. In addition, the circular order can be selected by any method based on the vibration magnitude NVn of each circular order and the mechanical resonance matching circular order Nm.

The selection result of the circular order by the circular order selection unit 1646 is output to the switching unit 1647 as the selected circular order Ns.

The switching unit 1647 has a plurality of input terminals and an output terminal, each input terminal corresponding to the phase shift amount $\Delta\theta n$ for each circular order calculated by the motor circular vibration map 1642, and switches the connection target of the output terminal to one of the input terminals according to the selected circular order Ns from the circular order selection unit 1646. Specifically, the connection state between the plurality of input terminals and the output terminal is switched so that the input terminal having the phase shift amount $\Delta\theta n$ corresponding to the selected circular order Ns is connected to the output terminal. As a result, one of the phase shift amounts $\Delta\theta n$ for each circular order is selected based on the selected circular order Ns, and output to the addition unit 1648 as the carrier wave phase difference $\Delta\theta carr$ representing the phase difference of the carrier wave with respect to the reference voltage phase $\theta vb$. As a result, for example, if the selected circular order Ns is circular 4th order, the phase shift amount $\Delta\theta 4$ corresponding to the circular 4th order is output from the switching unit 1647 to the addition unit 1648 as the carrier wave phase difference $\Delta\theta carr$.

By adding the carrier wave phase difference $\Delta\theta carr$ output from the switching unit 1647 to the reference voltage phase $\theta vb$ calculated by the reference voltage phase calculation unit 1641, the addition unit 1648 calculates the corrected reference voltage phase $\theta vb2$ for reducing the voltage amplitude of the target order component Nr of the capacitor voltage ripple.

The subtraction unit 1649 subtracts the corrected reference voltage phase $\theta vb2$ from the voltage phase $\theta v$ and calculates the voltage phase error $\Delta\theta v$.

The voltage phase error calculation unit 164 calculates the voltage phase error $\Delta\theta v$ as described above. Thus, based on the rotation speed ωr, the power supply voltage Hvdc, and the torque command T*, it is possible to determine the phase shift amount for reducing any vibration mode of the electromagnetic excitation force generated in the radial direction of the motor 2, and to determine the voltage phase error $\Delta\theta v$ so as to change the phase difference between the three-phase voltage commands Vu*, Vv*, and Vw* and the carrier wave signal Tr according to the determined phase shift amount. As a result, the carrier wave frequency fc can be set by changing the phase difference between the voltage command to the inverter 3 and the carrier wave used for pulse width modulation so as to effectively suppress vibration and noise caused by the electromagnetic excitation force of the motor 2.

In the carrier wave frequency adjustment unit 16, the above processing may be performed either during the power drive or the regenerative drive of the motor 2. During the power drive, the torque command T* becomes a positive value, and during the regenerative drive, the torque command T* becomes a negative value. Therefore, the carrier wave frequency adjustment unit 16 may determine whether the motor 2 is a power drive or a regenerative drive from the value of the torque command T*, and based on the result of the determination, the voltage phase error calculation unit 164 may perform the above calculation processing. By doing this, the carrier wave frequency fc can be set by changing the voltage phase error $\Delta\theta v$ so as to effectively suppress vibration and noise caused by the electromagnetic excitation force of the motor 2.

According to the first embodiment of the present invention described above, the following operations and effects are achieved.

(1) The motor control device 1, which controls the driving of the motor 2 connected to the inverter 3 performing power conversion from DC power to AC power and driven using the AC power, includes the carrier wave generation unit 17 that generates the carrier wave signal Tr, the carrier wave frequency adjustment unit 16 that adjusts the carrier wave frequency fc representing the frequency of the carrier wave signal Tr, and the PWM control unit 18 that performs pulse width modulation using the carrier wave signal Tr on the three-phase voltage commands Vu*, Vv*, and Vw* to generate the PWM pulse signal for controlling the operation of the inverter 3. The carrier wave frequency adjustment unit 16 adjusts the carrier wave frequency fc so as to change the voltage phase error $\Delta\theta v$ representing the phase difference between the three-phase voltage commands Vu*, Vv*, and Vw* and the carrier wave signal Tr based on the magnitude of vibration for each circular order of the electromagnetic excitation force generated circularly in the radial direction of the motor 2. Thus, vibration and noise caused by the electromagnetic excitation force of the motor 2 can be effectively suppressed.

(2) The carrier wave frequency adjustment unit 16 determines the vibration magnitude NVn for each circular order based on the rotation speed $\omega r$ of the motor 2, the torque command T*, and the voltage Hvdc of the DC power by the motor circular vibration map 1642. Thus, it is possible to accurately determine the vibration magnitude NVn for each circular order which varies according to the respective parameter values of the rotation speed $\omega r$, the torque command T*, and the power supply voltage Hvdc.

(3) The motor control device 1 includes the circular order selection unit 1646 that selects one of a plurality of circular orders based on the vibration magnitude NVn for each circular order. The carrier wave frequency adjustment unit 16 determines the phase shift amount $\Delta\theta n$ corresponding to the selected circular order Ns representing the circular order selected by the circular order selection unit 1646 as the carrier wave phase difference $\Delta\theta carr$, and adjusts the carrier wave frequency fc so as to change the voltage phase error $\Delta\theta v$ according to the determined carrier wave phase difference $\Delta\theta carr$. Thus, any vibration mode of the electromagnetic excitation force generated in the radial direction of the motor 2 can be reduced to effectively suppress vibration and noise.

(4) The motor control device 1 includes the motor circular vibration map 1642 for each of the plurality of circular orders in which the vibration magnitude NVn and the phase shift amount $\Delta\theta n$ are defined respectively for each of the rotation speed $\omega r$, torque command T* and power supply voltage Hvdc of the motor 2. The carrier wave frequency adjustment unit 16 calculates the vibration magnitude NVn and the phase shift amount $\Delta\theta n$ respectively for each circular order based on the current rotation speed $\omega r$, torque command T* and power supply voltage Hvdc of the motor 2, and the motor circular vibration map 1642. Thus, the vibration magnitude NVn and the phase shift amount $\Delta\theta n$ for each circular order according to the current drive state of the motor 2 can be accurately and easily calculated, respectively.

(5) The motor control device 1 includes the mechanical resonance matching circular order determination unit 1645 that specifies the circular order whose frequency matches with the mechanical resonance of the motor 2 as the mechanical resonance matching circular order Nm. The circular order selection unit 1646 selects one of the plurality of circular orders based on the vibration magnitude NVn for each circular order and the mechanical resonance matching circular order Nm. Thus, considering the mechanical resonance of the motor 2, the vibration mode of the circular order suitable for effectively suppressing vibration and noise can be selected as the target for reducing the electromagnetic excitation force.

Second Embodiment

Next, a second embodiment of the present invention will be described with reference to the drawings.

Figure 7:
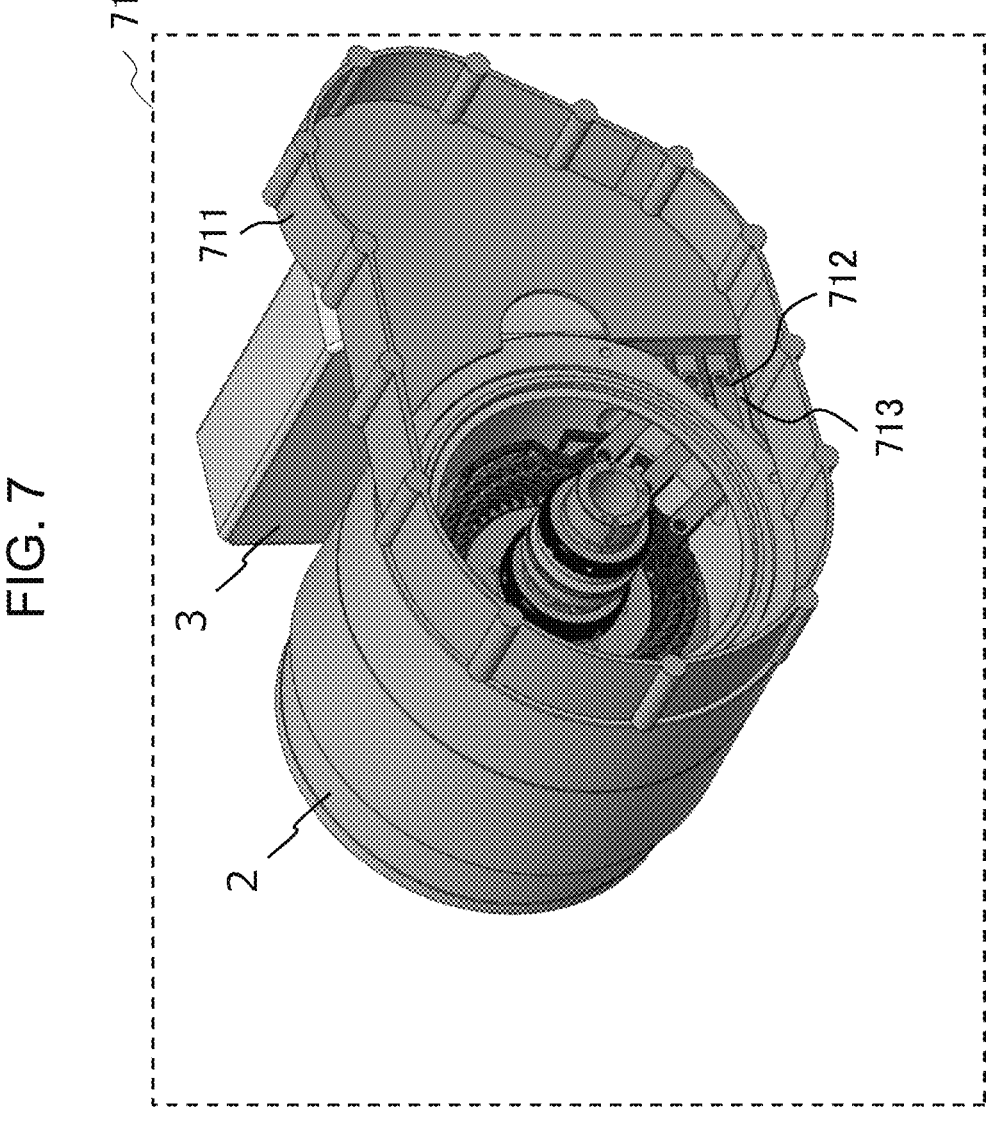
FIG. 7 is an external perspective view of an integrated electromechanical unit in the second embodiment of the present invention.

FIG. 7 is an external perspective view of the integrated electromechanical unit 71 in the second embodiment of the present invention. The integrated electromechanical unit 71 includes the motor drive system 100 (the motor control device 1, the motor 2 and the inverter 3) described in the first embodiment. The motor 2 and the inverter 3 are connected at a coupling part 713 through a bus bar 712. The output of the motor 2 is transmitted to a differential gear (not shown) through a gear 711, and is transmitted to an axle. Although the motor control device 1 is not shown in FIG. 7, the motor control device 1 can be arranged at any position.

A feature of the integrated electromechanical unit 71 is a structure in which the motor 2, the inverter 3, and the gear 711 are integrated. In the integrated electromechanical unit 71, due to such an integrated structure, vibration of each circular order caused by electromagnetic excitation force generated in the radial direction of the motor 2 causes mechanical resonance, and vibration and noise may increase. However, by controlling the drive of the motor 2 by using the motor control device 1 described in the first embodiment, vibration and noise caused by electromagnetic excitation force of the motor 2 can be effectively suppressed, and thus, an integrated unit with low vibration and noise can be realized.

Third Embodiment

Next, a third embodiment of the present invention will be described with reference to the drawings.

Figure 8:
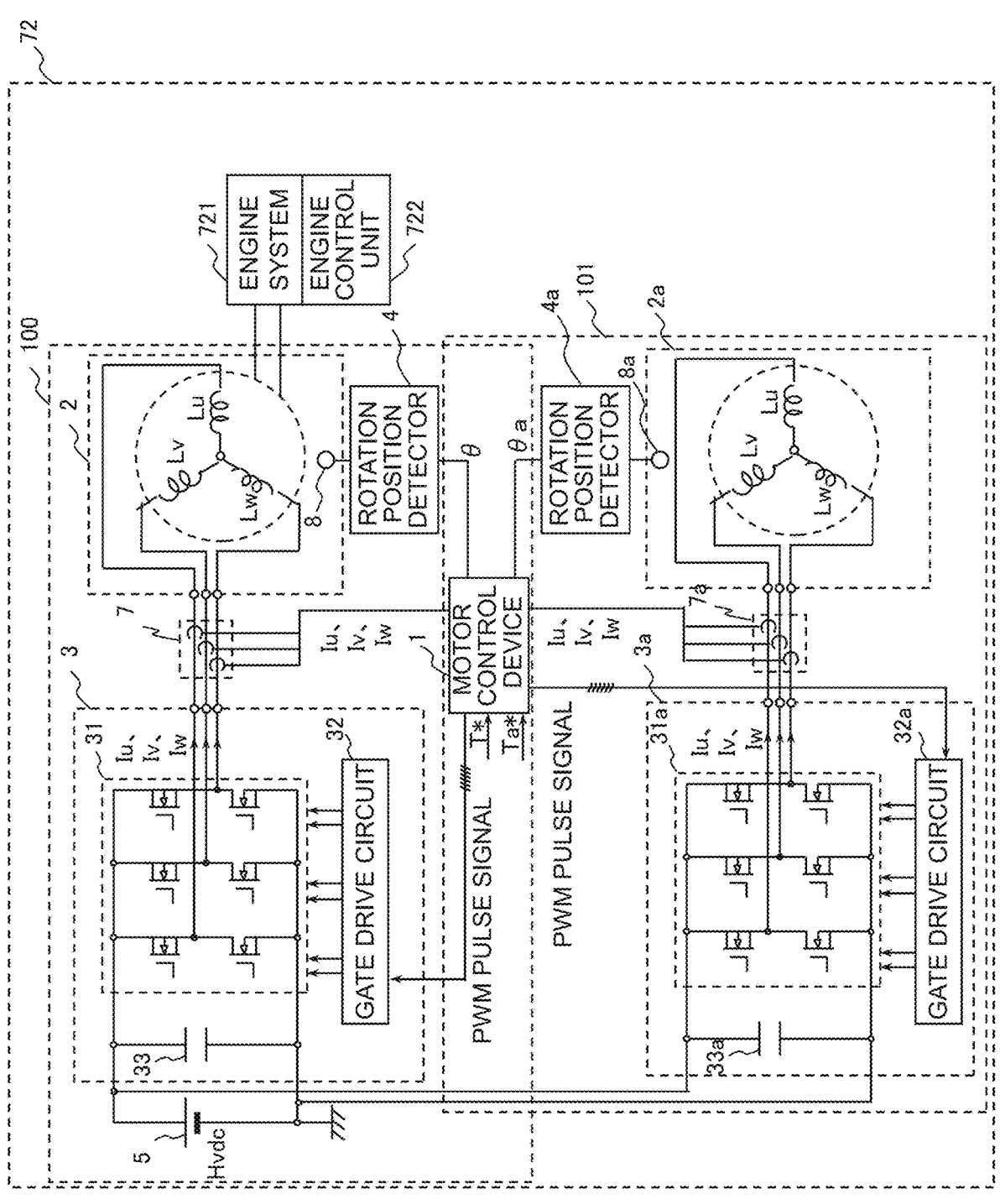
FIG. 8 is a configuration diagram of a hybrid system in the third embodiment of the present invention.

FIG. 8 is a configuration diagram of the hybrid system 72 in the third embodiment of the present invention.

As shown in FIG. 8, the hybrid system 72 includes the motor drive system 100 (the motor control device 1, the motor 2, the inverter 3, the rotation position detector 4, the high voltage battery 5, and the current detector 7) described in the first embodiment and a similar motor drive system 101 (the motor control device 1, a motor 2a, an inverter 3a, a rotation position detector 4a, the high voltage battery 5, and a current detector 7a). The motor drive systems 100 and 101 share the motor control device 1 and the high voltage battery 5 with each other.

A rotation position sensor 8a for detecting the rotation position $\theta a$ of the rotor is attached to the motor 2a. The rotation position detector 4a calculates the rotation position $\theta a$ from the input signal of the rotation position sensor 8a and outputs it to the motor control device 1. The current detection unit 7a is arranged between the inverter 3a and the motor 2a. Torque generated in the rotor of the motor 2a is transmitted from a rotary shaft fixed to the rotor to the outside of the motor drive system 101.

The inverter 3a has an inverter circuit 31a, a gate drive circuit 32a, and a smoothing capacitor 33a. The gate drive circuit 32a is connected to the motor control device 1 common to the gate drive circuit 32 of the inverter 3, and generates a gate drive signal for controlling each switching element of the inverter circuit 31a based on the PWM pulse signal input from the motor control device 1, and outputs it to the inverter circuit 31a. The inverter circuit 31a and the smoothing capacitor 33a are connected to the high voltage battery 5 common to the inverter circuit 31 and the smoothing capacitor 33.

A torque command T* for the motor 2 and a torque command Ta* for the motor 2a are input to the motor control device 1. Based on these torque commands, the motor control device 1 generates PWM pulse signals for controlling the driving of the motors 2 and 2a in the manner described in the first embodiment and outputs them to the inverters 3 and 3a, respectively. That is, the voltage phase error calculation unit 164 of the carrier wave frequency adjustment unit 16 of the motor control device 1 adjusts the frequency of the carrier wave signal Tr by calculating the voltage phase error Δθv so as to suppress vibration and noise caused by electromagnetic excitation force generated in the radial direction of the motors 2 and 2a in the motor drive systems 100 and 101. In the voltage phase error calculation unit 164, the circular order selection unit 1646 may select different circular orders for each of the inverters 3 and 3a and set the carrier wave phase differences Δθcarr respectively.

The engine system 721 and the engine control unit 722 are connected to the motor 2. The engine system 721 is driven by the control of the engine control unit 722 to rotate the motor 2. The motor 2 is rotated by the engine system 721 to operate as a generator and generate AC power. The AC power generated by the motor 2 is converted to DC power by the inverter 3 and charged to the high voltage battery 5. Thus, the hybrid system 72 can function as a series hybrid system. The engine system 721 and the engine control unit 722 may be connected to the motor 2a.

According to this embodiment, since the hybrid system 72 shown in FIG. 8 is realized by using the motor control device 1 described in the first embodiment, vibration and noise caused by electromagnetic excitation forces of the motors 2 and 2a can be effectively suppressed for the motor drive system 100 and the motor drive system 101, respectively.

Fourth Embodiment

Next, a fourth embodiment of the present invention will be described. In this embodiment, an example of application to a boost converter system will be described.

Figure 9:
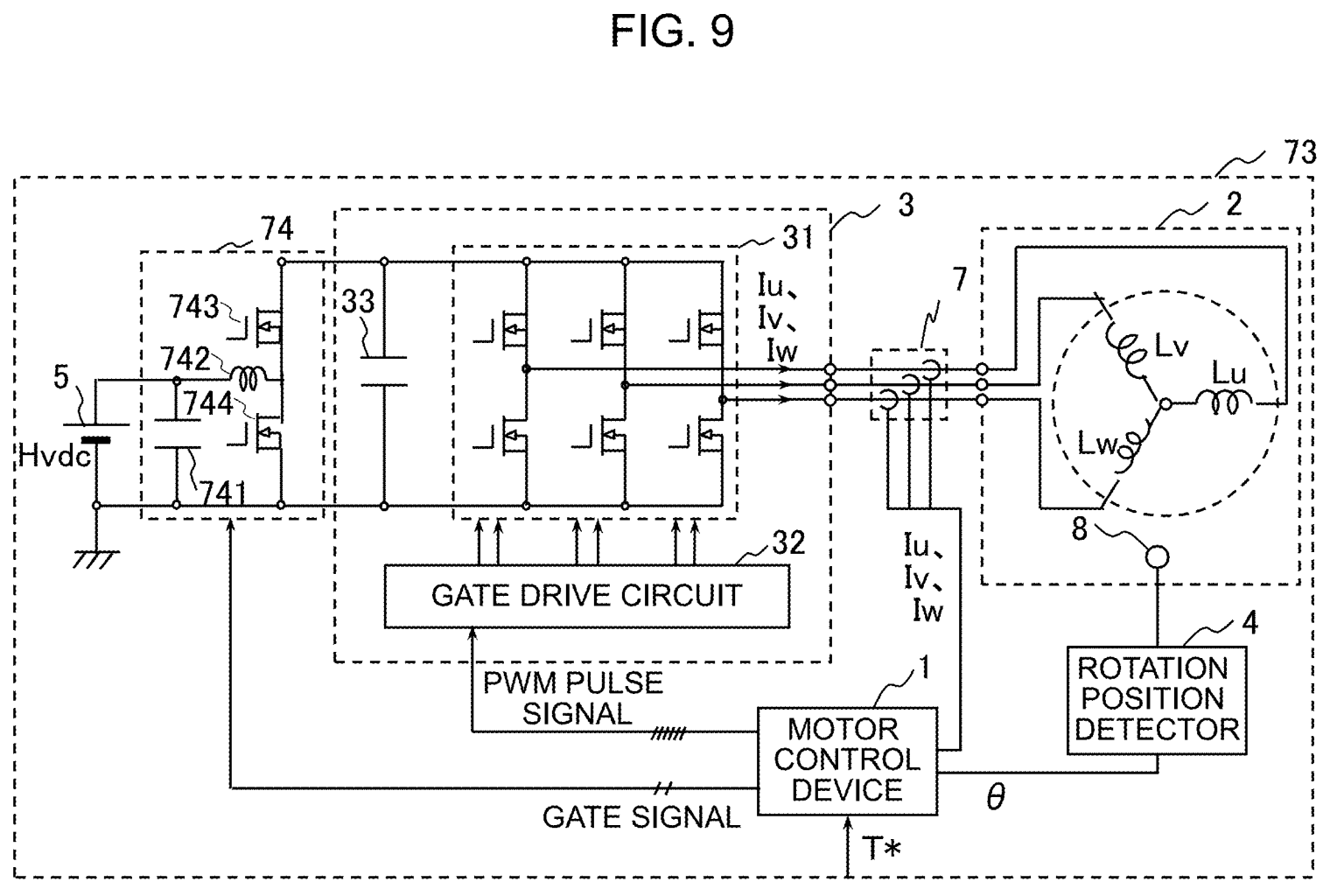

FIG. 9 is a diagram showing a configuration of a boost converter system according to the fourth embodiment of the present invention. The boost converter system 73 includes the motor control device 1, the motor 2, the inverter 3, the rotation position detector 4 and the high voltage battery 5 described in the first embodiment, and a boost converter 74.

In the boost converter 74, switching elements 743 and 744 are connected in series, and the high voltage battery 5 is connected via a reactor 742 to an intermediate connection point of the switching elements 743 and 744 connected in series. A capacitor 741 is connected in parallel with the high voltage battery 5.

Given a command by the motor control device 1 and performing switching operation by the switching elements 743 and 744 respectively, the boost converter 74 boosts the DC voltage supplied from the high voltage battery 5 to the DC voltage which is the most efficient of the boost converter system 73. Thus, the DC power boosted from the high voltage battery 5 is generated and supplied to the inverter 3. The inverter 3 operates based on the gate signal output from the motor control device 1 and converts the DC power boosted by the boost converter 74 into AC power.

In the present embodiment, the voltage phase error calculation unit 164 calculates the magnitude of vibration NVn and the phase shift amount Δθn for each circular order by referring to the motor circular vibration map 1642 based on the rotation speed ωr, the torque command T*, and the boosted power supply voltage Hvdc'. Thus, the frequency of the carrier wave signal Tr is adjusted by calculating the voltage phase error Δθv so as to suppress vibration and noise caused by electromagnetic excitation force generated in the radial direction of the motor 2.

Fifth Embodiment

Next, a fifth embodiment of the present invention will be described. In this embodiment, an example of application to an electric power steering system will be described.

Figure 10:
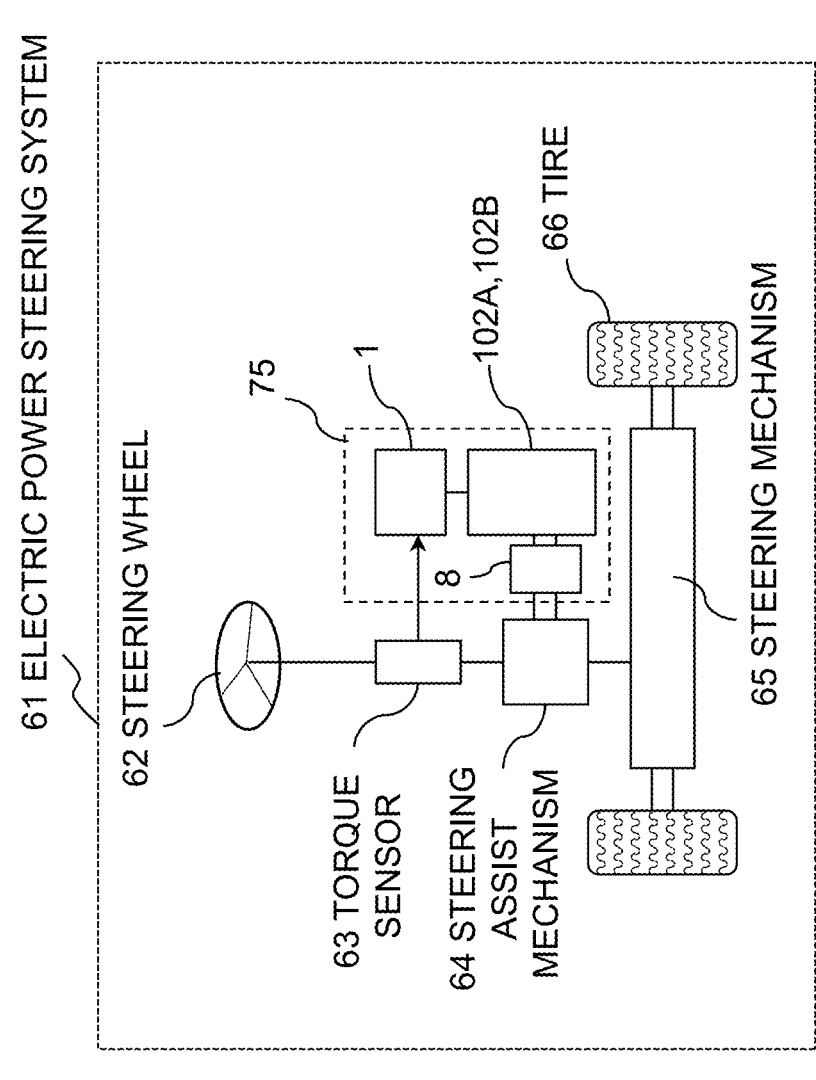
FIG. 10 is a configuration diagram of an electric power steering system in the fifth embodiment of the present invention.

FIG. 10 is a diagram showing a configuration of an electric power steering system according to the fifth embodiment of the present invention. The electric power steering system 61 has a drive control system 75 including the motor control device 1 described in the first embodiment and redundant drive systems 102A and 102B. The electric power steering system 61 detects the rotation torque of the steering wheel 62 by a torque sensor 63 and operates the drive control system 75 based on the rotation torque. Thereby, an assist torque corresponding to the input of the steering wheel 62 is generated and output to the steering mechanism 65 through the steering assist mechanism 64 to assist the steering force. As a result, the tires 66 are turned by the steering mechanism 65, and the traveling direction of the vehicle is controlled.

Generally, since the electric power steering system of the vehicle is directly connected to a driver via the steering wheel, vibration and noise are easily transmitted to the driver, and the required specifications for vibration and noise are high. In particular, when the driver rotates the steering wheel at a high speed, the operation of the motor becomes the dominant cause of vibration and noise compared with other causes. In contrast, the electric power steering system 61 of the present embodiment can effectively reduce vibration when the driver rotates the steering wheel 62 at a high speed, thereby realizing an electric power steering system with low vibration and low noise.

Figure 11:
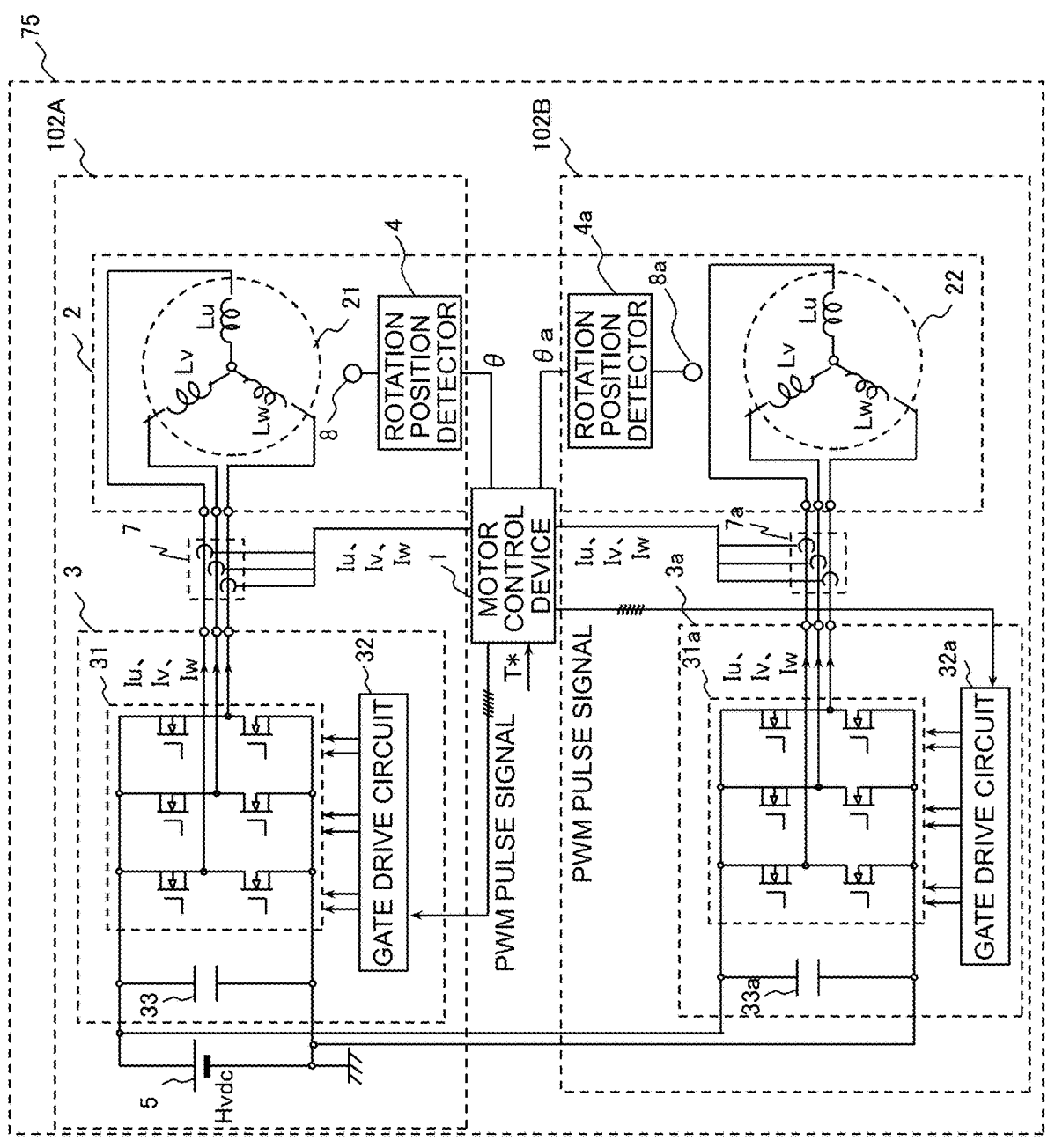
FIG. 11 is a configuration diagram of a drive control system in the electric power steering system in the fifth embodiment of the present invention.

FIG. 11 is a diagram showing a configuration of the drive control system 75 in the electric power steering system 61 of the fifth embodiment of the present invention. In the drive control system 75, the motor control device 1, the motor 2 and the high voltage battery 5 are commonly connected to the redundant drive systems 102A and 102B. In this embodiment, the motor 2 has two winding systems 21 and 22, one winding system 21 constitutes the drive system 102A, and the other winding system 22 constitutes the drive system 102B.

The drive system 102A has the inverter 3 and the rotation position detector 4, and the rotation position sensor 8 for detecting the rotation position θ of the rotor corresponding to the winding system 21 is attached to the motor 2. The AC power generated by the inverter 3 flows to the winding system 21 of the motor 2 to rotate the motor 2. In the drive system 102A, the current detection unit 7 is arranged between the inverter 3 and the motor 2.

The drive system 102B has an inverter 3a and a rotation position detector 4a, and a rotation position sensor 8a for detecting the rotation position θa of the rotor corresponding to the winding system 22 is attached to the motor 2. The AC power generated by the inverter 3a flows to the winding system 22 of the motor 2 to rotate the motor 2. In the drive system 102B, a current detection unit 7a is arranged between the inverter 3a and the motor 2. The inverter 3a, the rotation position detector 4a, the rotation position sensor 8a, and the current detection unit 7a are the same as those in FIG. 8 described in the third embodiment.

The motor control device 1 receives a torque command T* for the motor 2. Based on the input torque command T*, the motor control device 1 generates a PWM pulse signal for controlling the drive of the motor 2 by the method described in the first embodiment, and outputs the PWM pulse signal to the inverters 3 and 3a, respectively. That is, the voltage phase error calculation unit 164 adjusts the frequency of the carrier wave signal Tr by calculating the voltage phase error Δθv so as to suppress vibration and noise generated in the drive systems 102A and 102B, respectively. The motor circular vibration map 1642 referred to in this calculation may be, for example, a value that can most effectively reduce vibration and noise caused by electromagnetic excitation force generated in the radial directions of the motors 2 and 2a in the drive systems 102A and 102B, respectively. Alternatively, it may be a value that cannot most effectively reduce vibration and noise caused by electromagnetic excitation forces in the respective drive systems 102A and 102B, but can most effectively reduce vibration and noise when the electromagnetic excitation forces of the drive systems 102A and 102B are summed.

According to this embodiment, by implementing the drive control system 75 shown in FIG. 11 using the motor control device 1 described in the first embodiment, it is possible to effectively suppress vibration and noise caused by electromagnetic excitation forces of the motors 2 and 2a in the drive systems 102A and 102B, respectively.

In the embodiments described above, each component in the motor control device 1 (FIG. 2, FIG. 3, FIG. 4, etc.) may be configured to implement the functions of each component by a CPU and a program, regardless of the hardware configuration. When each component in the motor control device 1 is implemented by a CPU and a program, there is an advantage that the number of hardware units is reduced, thereby reducing the cost. The program can be stored in the storage medium of the motor control device in advance and provided. Alternatively, the program can be stored and provided on an independent storage medium, or the program can be recorded and stored on a storage medium of the motor control device by a network line. The program may be provided as a computer-readable computer program product in various forms, such as a data signal (carrier wave).

The present invention is not limited to the above-described embodiments, and various modifications can be made to the extent not deviating from the object of the present invention.

Reference Signs List

1 . . . motor control device, 2, 2a . . . motor, 3, 3a . . . inverter, 4, 4a . . . rotation position detector, 5 . . . high voltage battery, 7, 7a . . . current detector, 8, 8a . . . rotation position sensor, 11 . . . current command generation unit, 12 . . . speed calculation unit, 13 . . . three-phase/dq current conversion unit, 14 . . . current control unit, 15 . . . dq/three-phase voltage conversion unit, 16 . . . carrier wave frequency adjustment unit, 17 . . . carrier wave generation unit, 18 . . . PWM control unit, 31 . . . inverter circuit, 32 . . . gate drive circuit, 33 . . . smoothing capacitor, 61 . . . electric power steering system, 71 . . . integrated electromechanical unit, 72 . . . hybrid system, 73 . . . booster converter system, 74 . . . booster converter, 75 . . . drive control system, 100, 101 . . . motor drive system, 102A, 102B . . . drive system, 161 . . . synchronous PWM carrier wave number selection unit, 162 . . . voltage phase calculation unit, 164 . . . voltage phase error calculation unit, 165 . . . synchronous carrier wave frequency calculation unit, 166 . . . carrier wave frequency setting unit, 711 . . . gear, 712 . . . bus bar, 713 . . . coupling part, 721 . . . engine system, 722 . . . engine control unit, 1641 . . . reference voltage phase calculation unit, 1642 . . . motor circular vibration map, 1643 . . . circular order frequency calculation unit, 1644 . . . mechanical resonance information, 1645 . . . mechanical resonance matching circular order determination unit, 1646 . . . circular order selection unit, 1647 . . . switching unit, 1648 . . . addition unit, 1649 . . . subtraction unit

The invention claimed is:

1. A motor control device that controls driving of an AC motor connected to a power converter performing power conversion from DC power to AC power, the AC motor driven using the AC power, comprising:

a carrier wave generation unit that generates a carrier wave;

a carrier wave frequency adjustment unit that adjusts frequency of the carrier wave; and a PWM control unit that performs pulse width modulation using the carrier wave on a voltage command corresponding to a torque command to generate a PWM pulse signal for controlling operation of the power converter, wherein:

the carrier wave frequency adjustment unit adjusts the frequency of the carrier wave so as to change a phase difference between the voltage command and the carrier wave based on magnitude of vibration for each circular order of electromagnetic excitation force generated circularly in a radial direction of the AC motor; and the carrier wave frequency adjustment unit determines the magnitude of the vibration for each circular order based on a rotation speed of the AC motor, the torque command, and a voltage of the DC power.

2. A hybrid system comprising:

the motor control device according to claim 1;

the power converter operating on the basis of the PWM pulse signal output from the motor control device to perform power conversion from the DC power to the AC power;

the AC motor driven using the AC power; and an engine system connected to the AC motor.

3. A boost converter system comprising:

the motor control device according to claim 1;

a boost converter connected to a DC power supply and that generates DC power by boosting the DC power supply in accordance with control of the motor control device; and the power converter that operates based on the PWM pulse signal output from the motor control device and performs power conversion from the DC power boosted by the boost converter to the AC power.

4. An electric power steering system, comprising:

the motor control device according to claim 1;

a plurality of power converters that operate on the basis of the PWM pulse signal output from the motor control device and perform power conversion from the DC power to the AC power, respectively; and the AC motor having a plurality of winding systems and that drives by flowing the AC power generated by the plurality of power converters to the plurality of winding systems, respectively, wherein the electric power steering system controls steering of a vehicle using the AC motor.

5. A motor control device that controls driving of an AC motor connected to a power converter performing power conversion from DC power to AC power, the AC motor driven using the AC power, comprising:

a carrier wave generation unit that generates a carrier wave;

a carrier wave frequency adjustment unit that adjusts frequency of the carrier wave;

a PWM control unit that performs pulse width modulation using the carrier wave on a voltage command corresponding to a torque command to generate a PWM pulse signal for controlling operation of the power converter; and a circular order selection unit that selects one of a plurality of circular orders based on magnitude of vibration for each circular order, wherein:

the carrier wave frequency adjustment unit adjusts the frequency of the carrier wave so as to change a phase difference between the voltage command and the carrier wave based on the magnitude of the vibration for each circular order of electromagnetic excitation force generated circularly in a radial direction of the AC motor; and the carrier wave frequency adjustment unit determines a phase shift amount according to the circular order selected by the circular order selection unit and adjusts the frequency of the carrier wave so as to change the phase difference between the voltage command and the carrier wave according to the determined phase shift amount.

6. The motor control device according to claim 5, comprising a circular vibration map for each of the plurality of circular orders in which the magnitude of the vibration and the phase shift amount are defined respectively for each of a rotation speed of the AC motor, the torque command and a voltage of the DC power, wherein the carrier wave frequency adjustment unit calculates the magnitude of the vibration and the phase shift amount respectively for each circular order based on current rotation speed of the AC motor, the torque command and the voltage of the DC power, and the circular vibration map.

7. The motor control device according to claim 5, comprising a mechanical resonance matching circular order determination unit that specifies a circular order whose frequency matches with mechanical resonance of the AC motor as a mechanical resonance matching circular order, wherein the circular order selection unit selects one of the plurality of circular orders based on the magnitude of the vibration for each circular order and the mechanical resonance matching circular order.

8. A motor control method for controlling driving of an AC motor connected to a power converter performing power conversion from DC power to AC power, the AC motor driven using the AC power, comprising:

adjusting frequency of a carrier wave so as to change a phase difference between a voltage command corresponding to a torque command for the AC motor and the carrier wave based on magnitude of vibration for each circular order of electromagnetic excitation force generated circularly in a radial direction of the AC motor, generating the carrier wave at the adjusted frequency, and performing pulse width modulation using the carrier wave on the voltage command to generate a PWM pulse signal for controlling operation of the power converter;

wherein the magnitude of the vibration for each circular order is determined based on a rotation speed of the AC motor, the torque command, and a voltage of the DC power.

9. A motor control method for controlling driving of an AC motor connected to a power converter performing power conversion from DC power to AC power, the AC motor driven using the AC power, comprising:

adjusting frequency of a carrier wave so as to change a phase difference between a voltage command corresponding to a torque command for the AC motor and the carrier wave based on magnitude of vibration for each circular order of electromagnetic excitation force generated circularly in a radial direction of the AC motor, generating the carrier wave at the adjusted frequency, and performing pulse width modulation using the carrier wave on the voltage command to generate a PWM pulse signal for controlling operation of the power converter; wherein:

one of a plurality of circular orders is selected based on the magnitude of the vibration for each circular order;

a phase shift amount is determined according to the selected circular order; and the frequency of the carrier wave is adjusted so as to change the phase difference between the voltage command and the carrier wave according to the determined phase shift amount.

10. The motor control method according to claim 9, wherein:

reference is made to a circular vibration map for each of the plurality of circular orders in which the magnitude of the vibration and the phase shift amount are defined respectively for each of a rotation speed of the AC motor, the torque command and a DC voltage which is a voltage of the DC power; and the magnitude of the vibration and the phase shift amount are calculated respectively for each circular order based on current rotation speed of the AC motor, the torque command and the DC voltage, and the circular vibration map.

11. The motor control method according to claim 9, wherein:

a circular order whose frequency matches mechanical resonance of the AC motor is selected as a mechanical resonance matching circular order; and one of the plurality of circular orders is selected based on the magnitude of the vibration for each circular order and the mechanical resonance matching circular order.

* * * * *